(12) United States Patent
Randall

(10) Patent No.: US 8,880,649 B2
(45) Date of Patent: *Nov. 4, 2014

(54) AUTOMATIC CONTENT RETRIEVAL BASED ON LOCATION-BASED SCREEN TAGS

(71) Applicant: Monster Patents, LLC, Orlando, FL (US)

(72) Inventor: Stephen Randall, Wellesley, MA (US)

(73) Assignee: Monster Patents, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/136,788

(22) Filed: Dec. 20, 2013

(65) Prior Publication Data

US 2014/0108613 A1    Apr. 17, 2014

Related U.S. Application Data

(62) Division of application No. 12/556,394, filed on Sep. 9, 2009, now Pat. No. 8,615,565.

(60) Provisional application No. 61/095,313, filed on Sep. 9, 2008.

(51) Int. Cl.
*G06F 15/16* (2006.01)
*H04L 29/08* (2006.01)
*G06Q 30/02* (2012.01)

(52) U.S. Cl.
CPC ............... *H04L 67/18* (2013.01); *G06Q 30/02* (2013.01)
USPC ........... 709/218; 709/206; 709/217; 709/219; 709/223; 709/226; 709/229; 709/246

(58) Field of Classification Search
USPC ......... 709/206, 217, 218, 219, 223, 226, 229, 709/246
See application file for complete search history.

(56) References Cited

U.S. PATENT DOCUMENTS 5,781,889 A * 7/1998 Martin et al. .................. 705/1.1
6,484,148 B1   11/2002 Boyd ............................. 705/14

(Continued)

OTHER PUBLICATIONS

NTN Buzztime, Inc., "About NTN Integrated Solutions," http://ntnsoftware.com/about/history.asp, 2 pages, © 2007.

(Continued)

*Primary Examiner* — Liangche A Wang
(74) *Attorney, Agent, or Firm* — Sunstein Kann Murphy & Timbers LLP

(57) ABSTRACT

Systems and methods automatically obtain contents and display the contents on location-specific display screens, based on content attributes associated with the screens. Associating content attributes ("tags") with the screens allows administrators to specify the types of contents desired for display on the screens. For example, an establishment that caters to customers of a particular demographic (such as 21-27 year old singles, families with children, fans of rock-and-roll music, "bikers," sports fans or ice cream lovers) may associate one or more content attributes (such as "dating," "Disney," "Led Zeppelin," or "Red Sox") with its display screen. The system then automatically obtains contents based on the attribute(s) and displays the contents on the screen. Patrons with mobile telephones or web-based users may send text messages for display on the screen or play interactive games displayed on the screen, as described in the incorporated patent application. However, even absent such activity, the disclosed systems and methods populate the screen with potentially ever-changing contents, thereby keeping the screen "fresh" and avoiding a situation known as the "ghost town" effect. The system may obtain the contents to be displayed from a variety of sources. For example, Twitter messages ("Tweets") that contain or are otherwise associated (such as via "hashtags") with a content attribute of a screen may be displayed.

30 Claims, 21 Drawing Sheets

(56) References Cited

U.S. PATENT DOCUMENTS

| | | | |
|---|---|---|---|
| 6,608,556 B2 | 8/2003 | De Moerloose et al. | 340/501 |
| 7,647,613 B2 | 1/2010 | Drakoulis et al. | 725/87 |
| 7,685,259 B2 | 3/2010 | Strand | 709/219 |
| 8,615,565 B2 | 12/2013 | Randall | 709/218 |
| 2002/0046084 A1 | 4/2002 | Steele et al. | 705/14 |
| 2003/0009267 A1 | 1/2003 | Dunsky et al. | 701/4 |
| 2003/0078840 A1 | 4/2003 | Strunk et al. | 705/14 |
| 2004/0158865 A1* | 8/2004 | Kubler et al. | 725/82 |
| 2004/0259553 A1 | 12/2004 | Delaney et al. | 455/445 |
| 2005/0021393 A1 | 1/2005 | Bao et al. | 705/14 |
| 2005/0286546 A1* | 12/2005 | Bassoli et al. | 370/432 |
| 2008/0301750 A1* | 12/2008 | Silfvast et al. | 725/131 |
| 2008/0307320 A1* | 12/2008 | Payne et al. | 715/751 |
| 2009/0019085 A1* | 1/2009 | Abhyanker | 707/104.1 |
| 2009/0150433 A1* | 6/2009 | Uusitalo et al. | 707/104.1 |
| 2009/0164641 A1* | 6/2009 | Rogers et al. | 709/227 |

OTHER PUBLICATIONS ilike, "Take the tour—4 easy steps—Compare tastes," http://www.ilike.com/tour?page=3, 2 pages, 9 dated Sep. 8, 2008.

i-Systems Inc., "Feedreader OEM—White Label Solution," product description, http://www.feedreader.com/feedreaderoem, 3 pages, dated Sep. 8, 2008.

i-Systems Inc., "FeedReader Connect," product description, http://www.feedreader.com/feedreaderconnect, 4 pages, dated Sep. 8, 2008.

i-Systems Inc., "FeedReader overview," product description, http://www.feedreader.com/features.php, 4 pages, dated Sep. 8, 2008.

Friendfeed, "friendfeed," http://friendfeed.com/about, 2 pages, dated Sep. 8, 2008.

ilike, "About iLike," http://www.ilike.com/about, 6 pages, dated Sep. 8, 2008.

ilike, "Take the tour—4 easy steps—Free MP3s by new artists," http://www.ilike.com/tour?page=4. 2 pages, dated Sep. 8, 2008.

ilike, "Take the tour—4 easy steps—Add friends, get music," http://www.ilike.com/tour, 2 pages, dated Sep. 8, 2008.

ilike, "Take the tour—4 easy steps—Connect your music," http://www.ilike.com/tour, 2 pages, dated Sep. 8, 2008.

Office Action, U.S. Appl. No. 11/666,628, 19 pages, dated Mar. 16, 2010.

Internet Archive Wayback Machine, "Internet Archive Wayback Machine" http://webarchive.org/web/*/http://www.thesyn.com, 1 page, dated Apr. 23, 2010.

Touch Tunes, "My Touch Tunes/Be Your Own DJ," http://web.archive.org/web/20080709182459/http:www.mytouchtunes.com/, 2 pages, dated Apr. 23, 2010.

"*Akoo to launch digital out-of-home network in China*," ScreenMediaDaily.com, 1 page, dated Dec. 7, 2010.

\* cited by examiner

LOCALIZATION OF VIRTUAL COMMUNITIES
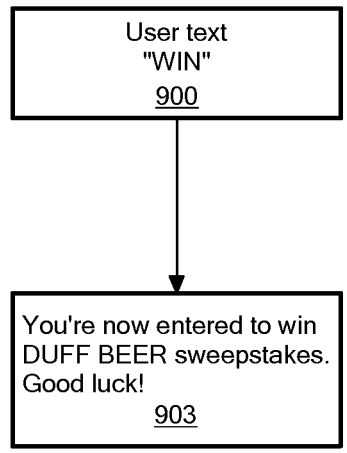
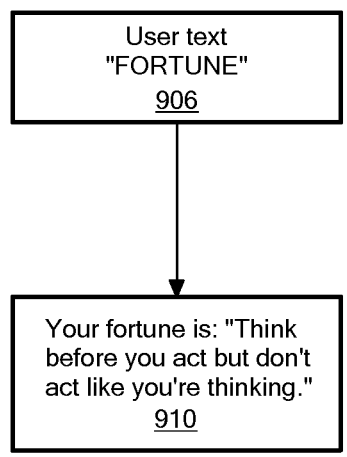
*FIG. 9*

AUTOMATIC CONTENT RETRIEVAL BASED ON LOCATION-BASED SCREEN TAGS

CROSS REFERENCE TO RELATED APPLICATIONS

This application is a divisional of U.S. patent application Ser. No. 12/556,394, filed Sep. 9, 2009, titled "Automatic Content Retrieval Based on Location-Based Screen Tags" (now U.S. Pat. No. 8,615,565, issued Dec. 24, 2013), and this application claims the benefit of U.S. Provisional Application No. 61/095,313, filed Sep. 9, 2008, titled "Automatic Content Retrieval Based on Location-Based Screen Tags," the entire contents of all of which are hereby incorporated by reference herein, for all purposes. In addition, the entire contents of PCT Patent Application No. PCT/US2005/040186, titled "A System and Method for Interactive Marketing," filed Nov. 4, 2005, and U.S. Provisional Patent Application No. 60/624,712, filed Nov. 4, 2004, and U.S. Provisional Patent Application No. 61/031,332, titled "Apparatus and Methods for Associating a User's Activity in Relation to a Physical Location with a Virtual Community," filed February 25, and PCT Patent Application No. PCT/US09/35146, titled "Apparatus and Methods for Associating a User's Activity in Relation to a Physical Location with a Virtual Community," filed Feb. 25, 2009, are all hereby incorporated by reference herein, for all purposes.

TECHNICAL FIELD

The present invention relates to virtual community web sites (sometimes called social networking web sites), and more particularly to technology that associates a user's activity in relation to a physical location with a virtual community.

BACKGROUND ART

It is known in the prior art to provide social networking web sites, which include www.facebook.com and www.myspace.com and www.dodgeball.com. The last web site permits social interaction using a mobile telephone in relation to the web site.

SUMMARY OF THE INVENTION

An embodiment of the invention provides a computer-implemented method of displaying contents selected based on a location of a location-specific display screen. At least one content attribute is associated with the display screen. Contents are automatically obtained over a computer network. The contents are based on at least one of the at least one content attribute associated with the display screen. The obtained contents are displayed on the display screen.

Displaying the obtained contents on the display screen may involve displaying the obtained contents on a display screen coupled via a computer to a wide area network, a display screen of a jukebox, a display screen of an interactive game system, a display screen of a point-of-sale kiosk, or a display screen coupled to a private television distribution network.

Optionally, the contents displayed on the screen may be made available via the Internet as a web page.

Associating the at least one content attribute with the display screen may include associating a plurality of content attributes with the display screen.

Each of the plurality of content attributes may be selected from a set consisting of: location of the screen, venue type of the location of the screen, a demographic characteristic of an expected viewer of the screen, and a message topic.

Associating the at least one content attribute with the display screen may include receiving a message sent by a user to an address associated with the screen. The message may identify the at least one content attribute.

Receiving the message may include receiving a message sent by the user from a mobile telephone or receiving a message sent by the user from an Internet-connected computer, where the message traverses at least a portion of the Internet.

Associating the at least one content attribute with the display screen may include accepting a user-specified content attribute via an administrative interface and associating the user-specified content attribute with the display screen.

Optionally or alternatively, associating the at least one content attribute with the display screen may include automatically identifying the content attribute. The content attribute may be identified based on content of at least one message already displayed on the display screen or based on content of at least one message to be displayed on the display screen.

Associating the at least one content attribute with the display screen may include receiving information descriptive of an activity currently taking place at the location of the display screen. Receiving information descriptive of an activity currently taking place may include receiving automatically-generated information from a game system or receiving automatically-generated information about a song being played by a jukebox.

Automatically obtaining contents may include automatically obtaining additional information about the song being played by the jukebox, such as information about other locations where the song is currently being played or information about people who are currently playing the song in other locations or information about people who have indicated an interest in the song or in an artist who performed the song.

Automatically obtaining the contents over the computer network may include automatically obtaining the contents, via the Internet, from: a social networking system, a news data system, a classified advertisement system, an entertainment information system, a syndicated data feed system or an advertisement system.

Automatically obtaining the contents over the computer network may include automatically querying a computer system, via the Internet, for the contents.

Automatically obtaining the contents over the computer network may include subscribing to a data feed from a computer system and receiving contents automatically sent by the computer system in response to the subscription.

Optionally, a subset of the obtained contents may be automatically selected according to a rule base. A selected subset of the obtained contents may be displayed the on the display screen.

The rule base may at least statistically favor displaying contents that were generated specifically for the display screen over contents that were not specifically generated for the display screen. The rule base may at least statistically favor displaying contents that are associated with the display screen over contents that are not associated with the display screen. The rule base may at least statistically favors displaying contents that are associated with the location of the display screen over contents that are not associated with the location of the display screen.

Optionally, other contents displayed on another location-specific display screen may be obtained and the other contents may be displayed on the display screen.

Automatically obtaining the other contents or displaying the other contents may be performed such that the other contents are selected according to at least one rule or such that at least of the at least one rule disfavors selecting contents associated with a predetermined set of other location-specific display screens.

Displaying the obtained contents on the display screen may include displaying the obtained contents for a predetermined amount of time or for an amount of time based at least in part on other contents displayed on the screen. The amount of time may be based at least in part on a number of other contents displayed on the screen.

Another embodiment of the invention provides a computer-implemented method of displaying contents on a location-specific display screen. Contents are automatically selected, based on the location of the display screen. The contents are sent for display on the display screen. In addition, the contents are made available as a web page.

Selecting the contents may include selecting the contents based on at least one content attribute associated with the display screen.

Yet another embodiment of the invention provides a computer-implemented method of displaying contents on a location-specific display screen. A message, sent by a user to an address associated with the screen, is received. The message contains contents. The contents received in the message are displayed on the display screen.

An embodiment of the invention provides a computer-implemented method for providing interactive displays. At least one web page is made available from an IP address for serving over a first network. The web page is made available to a plurality of network addressable screens. Each screen is addressable via the first network, so as to provide content particularized to each of the screens. In addition, the web page is made available to other computers coupled to the first network and in communication with the IP address. Commands received over a second network from user communication devices are translated, and the translated commands are used to affect content on the screens. Each user communication device separately affects content on a selected one or more of the screens. Content included with one of the received commands is displayed on the selected one or more screens for a predetermined amount of time.

Another embodiment of the invention provides a system for displaying contents selected based on a location of a location-specific display screen. The system includes a plurality of location-specific display screens. An administrative user interface is configured to receive at least one content attribute. A server is coupled to the plurality of location-specific display screens and to the administrative user interface. The server is configured to store the received at least one content attribute. The server is also configured to associate the received at least one content attribute with at least one of the plurality of location-specific display screens and to automatically obtain contents over a computer network. The contents are based on at least one of the at least one received content attribute. The server is also configured to display the obtained contents on the at least one of the plurality of location-specific display screens.

BRIEF DESCRIPTION OF THE DRAWINGS

The foregoing features of invention will be more fully understood by referring to the following Detailed Description of Specific Embodiments in conjunction with the Drawings, of which:

FIG. 9 illustrates further functionality (such as contests or sweepstakes, and FORTUNE) in connection with an embodiment of the present invention, that may be invoked by a person using a personal communication device who, in the manner of FIG. 4, has logged in to the physical location's proxy;

DETAILED DESCRIPTION OF SPECIFIC EMBODIMENTS

Definitions

Figure 1:
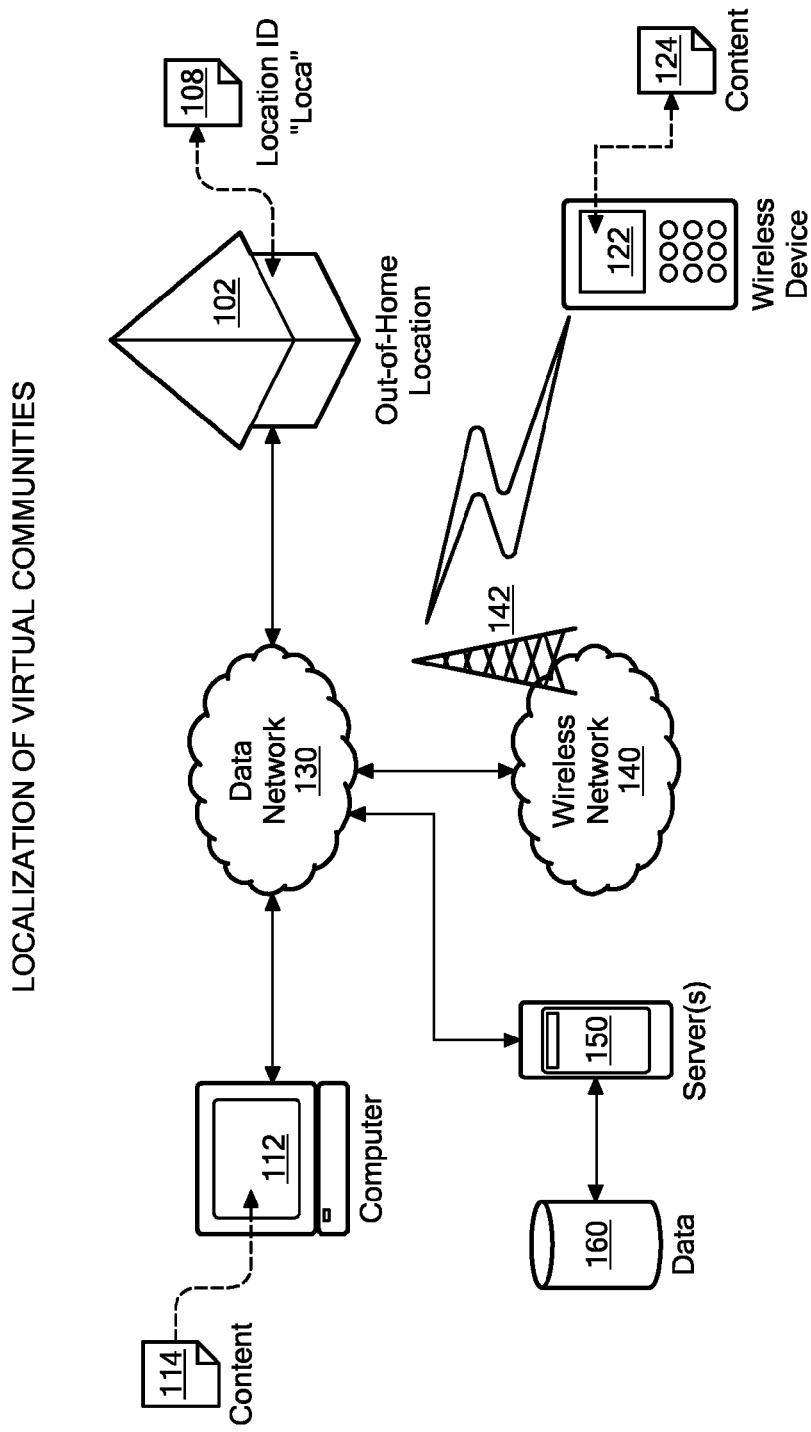
FIG. 1 is a block diagram of a system in accordance with an embodiment of the present invention permitting a user's activity in relation to a physical location to be associated with a virtual community web site.

As used in this description and the accompanying claims, the following terms shall have the meanings indicated, unless the context otherwise requires:

To "update" content includes storing data relevant to such content in the first instance.

Information "inherent" in a message includes information derivable from the format of the message.

Systems and methods are described for automatically obtaining contents and displaying the contents on location-specific display screens, based on content attributes associated with the screens. Associating content attributes ("tags") with the screens allows administrators to specify the types of contents desired for display on the screens. For example, an establishment that caters to customers of a particular demographic (such as 21-27 year old singles, families with children, fans of rock-and-roll music, "bikers," sports fans or ice cream lovers) may associate one or more content attributes (such as "dating," "Disney," "Led Zeppelin," or "Red Sox") with its display screen. The system then automatically obtains contents based on the attribute(s) and displays the contents on the screen. Patrons with mobile telephones or web-based users may send text messages for display on the screen or play interactive games displayed on the screen, as described in the incorporated patent application. However, even absent such activity, the disclosed systems and methods populate the screen with potentially ever-changing contents, thereby keeping the screen "fresh" and avoiding a situation known as the "ghost town" effect. The system may obtain the contents to be displayed from a variety of sources. For example, Twitter messages ("Tweets") that contain or are otherwise associated (such as via "hashtags") with a content attribute of a screen may be displayed.

An exemplary system includes: (a) a plurality of location-based display screens, each of which can be associated (tagged) with content selection information; and (b) a server that (i) automatically retrieves and/or is fed content based on the tags and that (ii) causes each screen to display at least selected portions of the content that is retrieved/fed for the screen. The content may include text, still images, videos, etc. The screen may also display contents (typically text) that are sent to the screen by users of mobile telephones (ex., via text message) and by users of Internet-connected computers (ex., via e-mail). The tagging may include: expected demographics of viewers of the screen; type of venue (ex., bar, club, ice cream parlor, etc.) of the screen; desired content type (ex., sports, politics, ice cream, Led Zeppelin, etc.) for the screen, etc. The content may be retrieved/fed from Internet-based sources, such as social networks (ex., Twitter and Facebook), RSS feeds, advertisement servers, news services or other sources (ex., CNN.com and Craigslist.com). The tagging may be performed by an administrator of the screen. Optionally or alternatively, a user of the system may send a text message, e-mail message, or the like, identifying a screen and containing a command to add or remove a tag to/from the screen. Optionally or alternatively, tags may be added or removed automatically, such as in response to activity on a game system or a jukebox co-located with the screen (ex., based on the current game being played on the game system or the current song being played by the jukebox). Because each screen is in a fixed location (ex., Toscanini's ice cream in Central Square, Cambridge, Mass.), the contents selected based on the tagging are directed to the particular location and, therefore, to an expected audience of the particular demographic.

Such content selection and delivery enables advertisers, for example, to target audiences, without knowing a priori where those audiences will be located or when the audiences will be available. In other words, the advertisers may simply specify attributes for their advertisements, and the system delivers the advertisements where and when appropriate audiences are identified. The system also accommodates shifts in time and location of audiences, in that the screen tags may automatically expire after predetermined periods of time, and fresh (possibly different) attributes may then be associated with the screens. Such a dynamic system accommodates an establishment that caters to one type of customer during one part of the day or week and caters to a different type of customer during a different part of the day or week.

FIG. 1 is a block diagram of a system in accordance with an embodiment of the present invention permitting a user's activity in relation to a physical location to be associated with a virtual community web site. Typically a user may use a computer 112 to access, over a data network 130 (which may be the Internet), content 114 in a virtual community web site, established by server(s) 150 coupled to data storage 160. In addition, a user may have a personal communication device (such as a mobile telephone or other wireless device) 122 to engage in data communication first over a wireless network 140 and then via the data network 130 to access content 124 in a virtual community website established by the server(s) 150.

The embodiment of FIG. 1 integrates these facilities, relative to one or more physical locations. In FIG. 1, a representative physical location is shown as out-of-home location 102. In this embodiment, we associate a dynamic collection of data with the location 102, and to access the dynamic collection of data associated with the location 102, we apply a logical identifier that we call a "loca" 108, which is unique for the specific location. In other words, each physical location integrated into the system has a unique logical identifier, that is, a unique loca 108. The ultimate repository of the data associated with the location 102 may be the data storage 160. In the present embodiment, the user may therefore employ the personal communication device 122 to access information about the location 102 itself, and, as we shall see, to communicate with others who have indicated their presence at the location 102.

Figure 2:
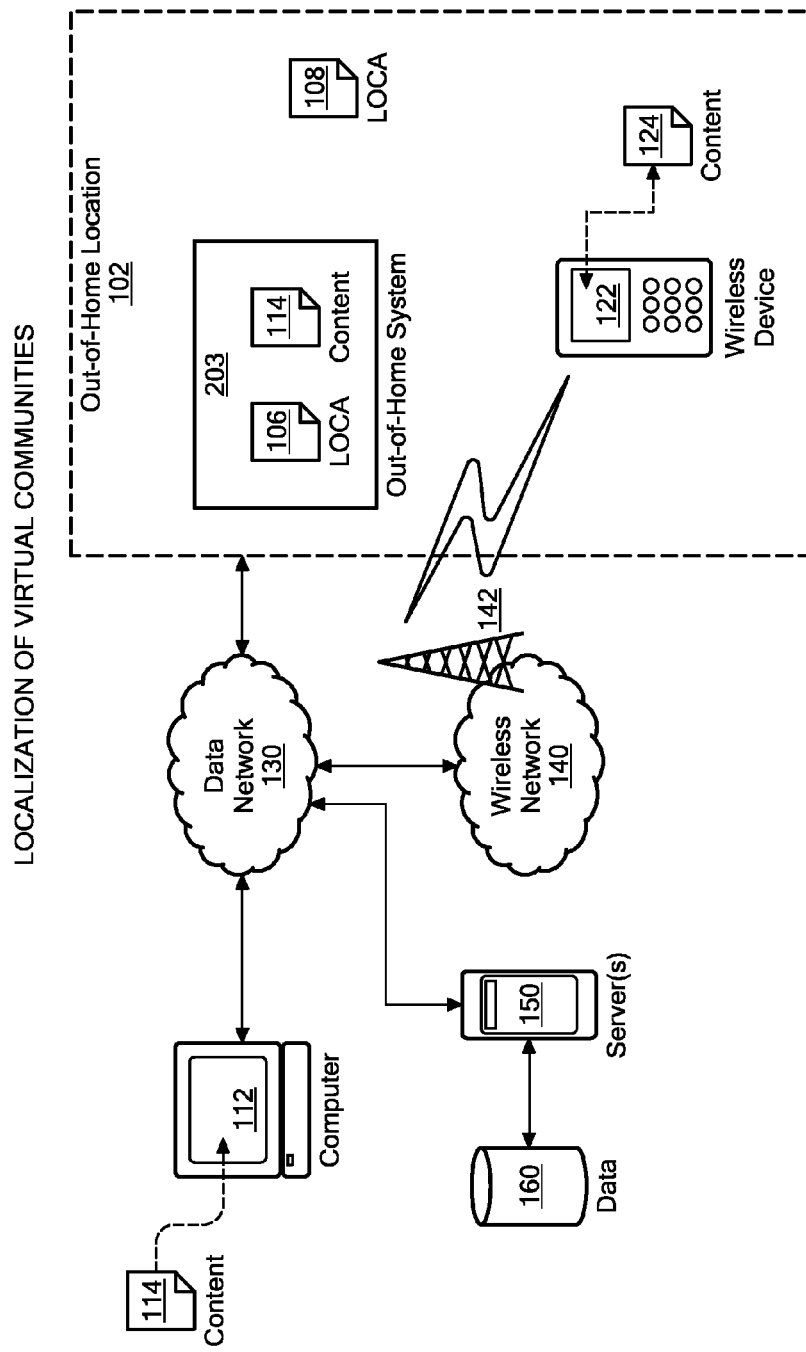
FIG. 2 is a block diagram of the embodiment of FIG. 1 showing further detail of components associated with the physical location.

FIG. 2 is a block diagram of the embodiment of FIG. 1 showing further detail of components associated with the physical location. The dynamic collection of data associated with physical location 102 we call a "proxy" (represented as the out-of-home system 203 of FIG. 2) for the physical location 102, and the proxy is established in the virtual world (namely on the virtual community web site). The proxy 203 includes dynamic content 114 pertinent to the location 102 as well as a suite of loca-based data 106 relating to the location. This data is communicated over the data network 130 and is stored in data storage 160.

Figure 3:
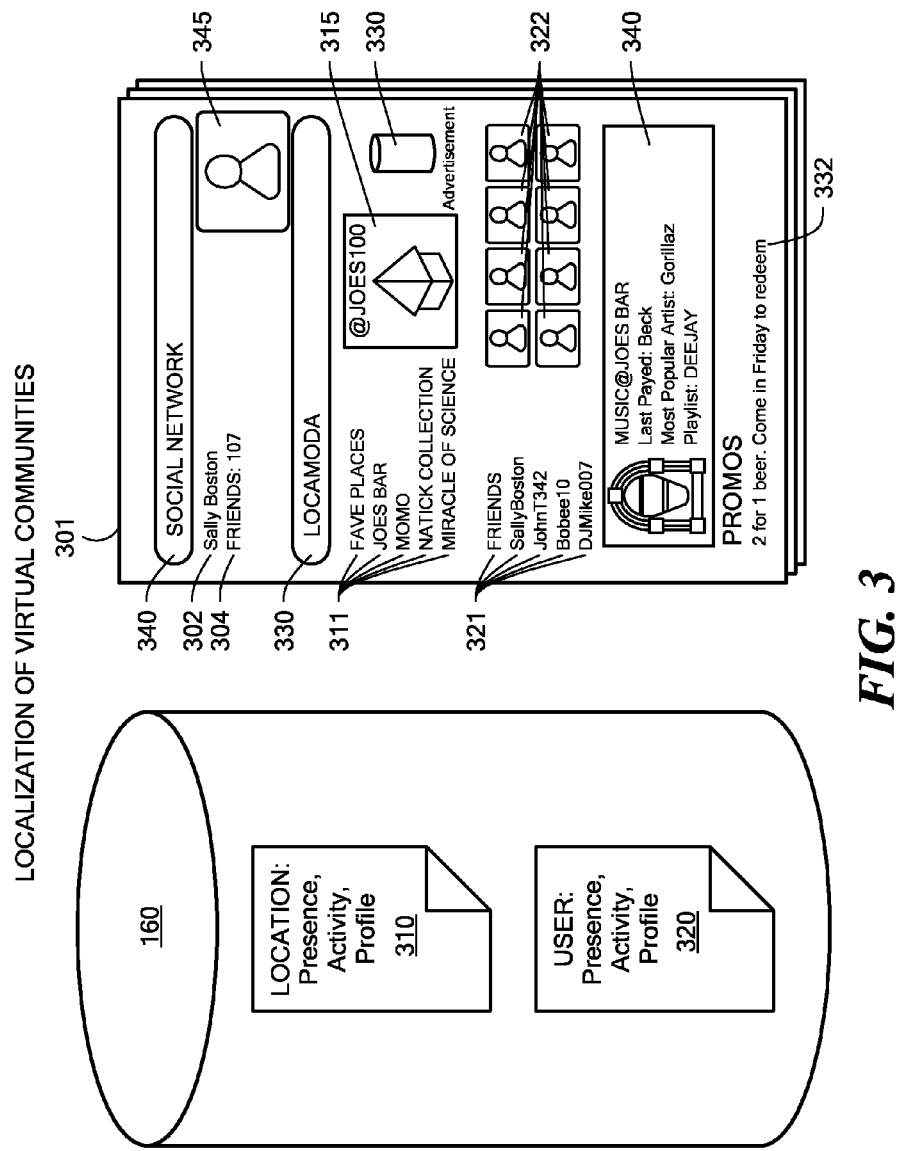
FIG. 3 illustrates structural detail, in an embodiment such as that of FIG. 1, of data stored in relation to a location and to a user, as well as the manner in which a web page associated with a user of the virtual community web site is also associated with a physical location.

FIG. 3 illustrates structural detail, in an embodiment such as that of FIG. 1, of data stored in data storage 160 of FIG. 1 in relation to a location and to a user, as well as the manner in which a web page associated with a user of the virtual community web site is also associated with a physical location.

Beginning on the left side of FIG. 3, we see content of data storage 160. In this embodiment, for each location having a proxy in the embodiment of FIG. 1, there is stored information 310 that identifies: (i) the presence of any users who have made themselves known in relation to the location, typically via their personal communication devices, (ii) any activities under way with respect to the location, and (iii) a profile of the location, in terms of its commercial offerings, its address and other contact information, and other details concerning the location that may be of interest to the virtual community. In a complementary manner, there is stored for each user of the system, information 320 that identifies: (i) any presence of the user at the location, (ii) any activities of the user at the location, and a profile of the user.

Turning now to the right side of FIG. 3, we see a representative web page 301 associated both with a user of the virtual community web site and also associated with a physical location; this web page relies on data stored in data storage 160. The virtual community web page 301 identifies the name of the virtual community with banner 340, and includes a photograph, avatar or icon 306 of the user, and provides a user name 302 and a hyperlink 304 to user-designated "Friends" of the user who are also members of the virtual community. Under the "LocaModa" banner 330 is provided a listing of hyperlinks 311 to proxies for locations that the user has identified as favorites ("Fave Places") and that are in data storage 160. Here "Joe's Bar" has been highlighted, and accordingly information concerning this location is provided. Immediately to the right of the listing of hyperlinks 311 is a picture or icon representing Joe's bar, as well as text specifying the "loca" (logical identifier) for that location used in sending messages from a user's personal communication device relating to the location. Next, presence information is provided listing those individuals 321 who are "Friends" of the user who have additionally made themselves known in relation to the location's proxy via messaging on their personal communication devices. Photographs, avatars or icons 322 of the individuals 321 are also provided. A region 340 of the web page is devoted to activities at the location, and here displayed is activity of the jukebox (for example) at Joe's Bar. The juke box is shown to be accessed by a user using the user's personal communication device by sending a message to "music@joesbar." The region 340 also displays the music last played, the most popular artist and the playlist identifier. Regions 332 and 345 of the web page include advertising content, and this content may be customized, if desired, based on profile data for the location whose hyperlink has been invoked. In other words, the advertisement could relate to bars in other cities, other hot spots in the vicinity of the location, etc. Customization can also be based on the user profile data. Region 332 includes promotion information specific to the location, and here the offer is "2 for 1 beer."

Figure 4:
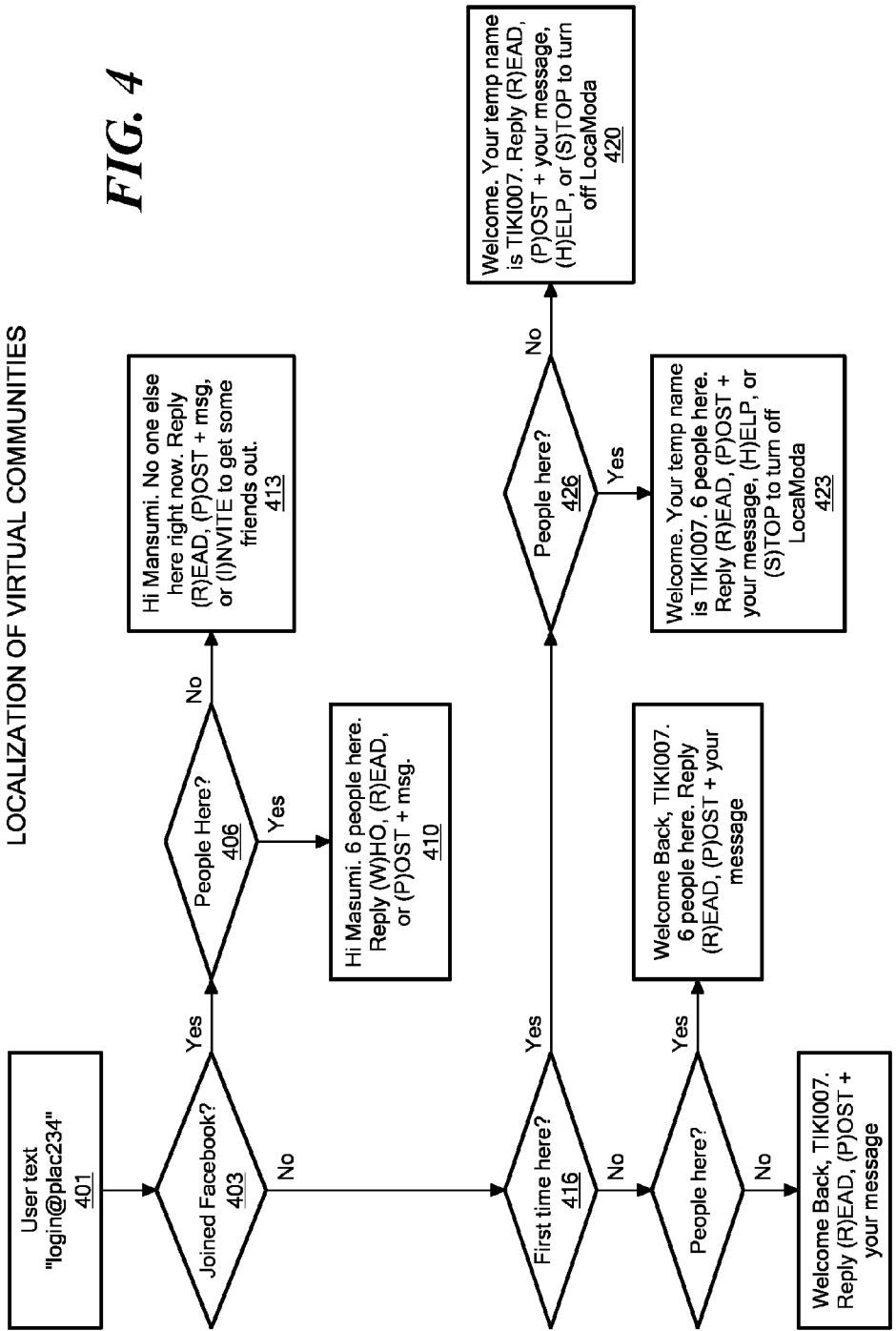
FIG. 4 illustrates logical flow associated with an embodiment, such as that of FIG. 1, by which a person using a personal communication device and carrying on an activity in relation to a physical location may use messaging to log in to the physical location's proxy so as to interact with components of the virtual community web site to associate the activity with the virtual community.

FIG. 4 illustrates logical flow associated with an embodiment, such as that of FIG. 1, by which a person using a personal communication device and carrying on an activity in relation to a physical location may use messaging to log in to the physical location's proxy so as to interact with components of the virtual community web site to associate the activity with the virtual community. (By way of background, it is possible for a user equipped with a personal communication device to interact at the location when it is equipped with a large display in the manner described in our International Application PCT/US2005/040186, published May 18, 2006 as WO2006/052837 and entitled "A System and Method for Interactive Marketing;" this application is hereby incorporated herein by reference in its entirety, and referred to below as "our PCT Application.") In this figure, and in FIGS. 4-9 generally, we assume that the user is using a mobile telephone to send text messages, such as e-mail messages or Short Message Service (SMS) messages. However, it will be appreciated that other personal communication devices may be used, and that the messaging may also include data other than text, including multimedia data. To log in to the location, the user sends a text message to the e-mail address of the loca (the logical identifier) for the location. FIG. 4 shows the loca as "@plac234." To the left of the @ symbol is placed the relevant function or activity that relates to the location. Because in the case of FIG. 4 the function is logging in, the left side of the e-mail address for the text message is "login." The complete e-mail address is therefore "login@plac234." When the user sends this text message 401, the user is identified to the system by the user's phone number, and the loca is used by the system for properly associating the user with the appropriate location proxy. The system uses the user's phone number to determine 403 whether the user has already joined the virtual community (in this example, Facebook). If so, there is further branching 406 depending on whether other users have logged in to the location proxy. If so, then there is a responsive message 410 back to the user identifying the number of "people here." The responsive messages include codes at the end to simplify user interaction with the system. In this case, the use can ask "(W)HO, (R)EAD, or (P)OST." The POST command applies to a message that the user would send with it. Note that once the user is logged in, further system interaction is handled merely by processing message replies of the user. If other users have not logged in to the system, then the user is so informed 413 and given the options of (R)EAD, (P)OST+message, OR (I)NVITE. If, in FIG. 4, the user has not joined Facebook, then there is further branching 416 according to whether it is the user's first time at the location (if so a temporary name is assigned to the user 420 or 423) and whether there are others who have logged in 426 to the location's proxy.

Figure 5:
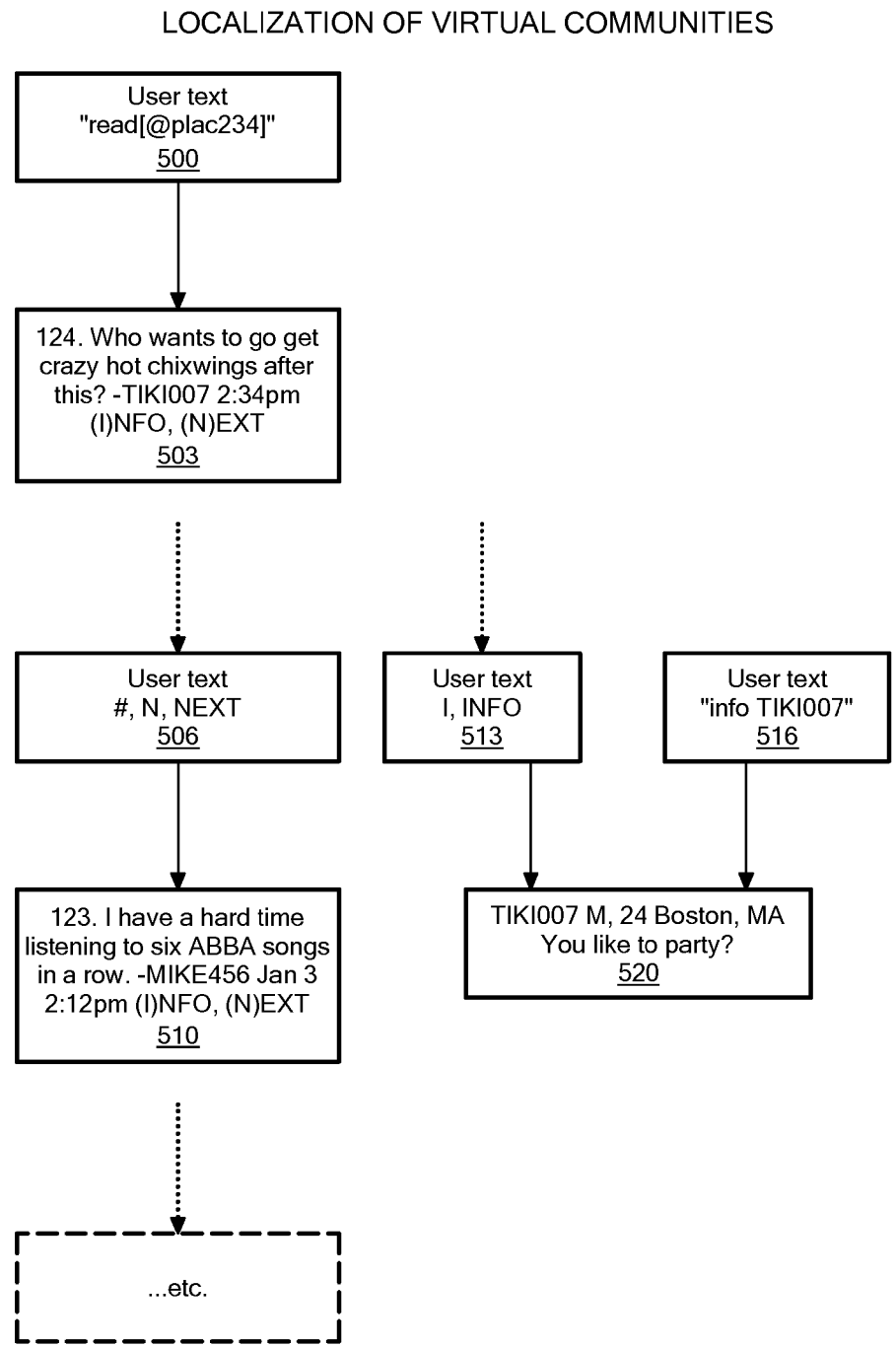
FIG. 5 illustrates messaging exchanges that may be hosted by an embodiment of the present invention among users, associated through the virtual community web site, who have logged in to the physical location's proxy in the manner of FIG. 4.

FIG. 5 illustrates messaging exchanges that may be hosted by an embodiment of the present invention among users, associated through the virtual community web site, who have logged in to the physical location's proxy in the manner of FIG. 4. In this figure, the user, who has already logged in to location having the loca @place234 as illustrated in FIG. 4, has sent 500 the reply message "READ," and is presented 503 with a message, having a posting number 124, from a user having an identification as TIKI007. The message, as usual, gives the user a number of commands that the user can enter in reply, including (N)EXT. In the next example of this figure, immediately below, the user has sent a commend 506 (which can be by specifying the message number, by typing N, or by typing NEXT, in the reply message) asking for the next message, and the system replies 510 with message 123 and a number of commands that the user can enter in reply. Alternatively, following the message number 124, as illustrated in the examples to the right, the user may 513 reply with I or INFO in the message or 516 with "Info tiki007," and get a system reply 520 with data about tiki007.

Figure 6:
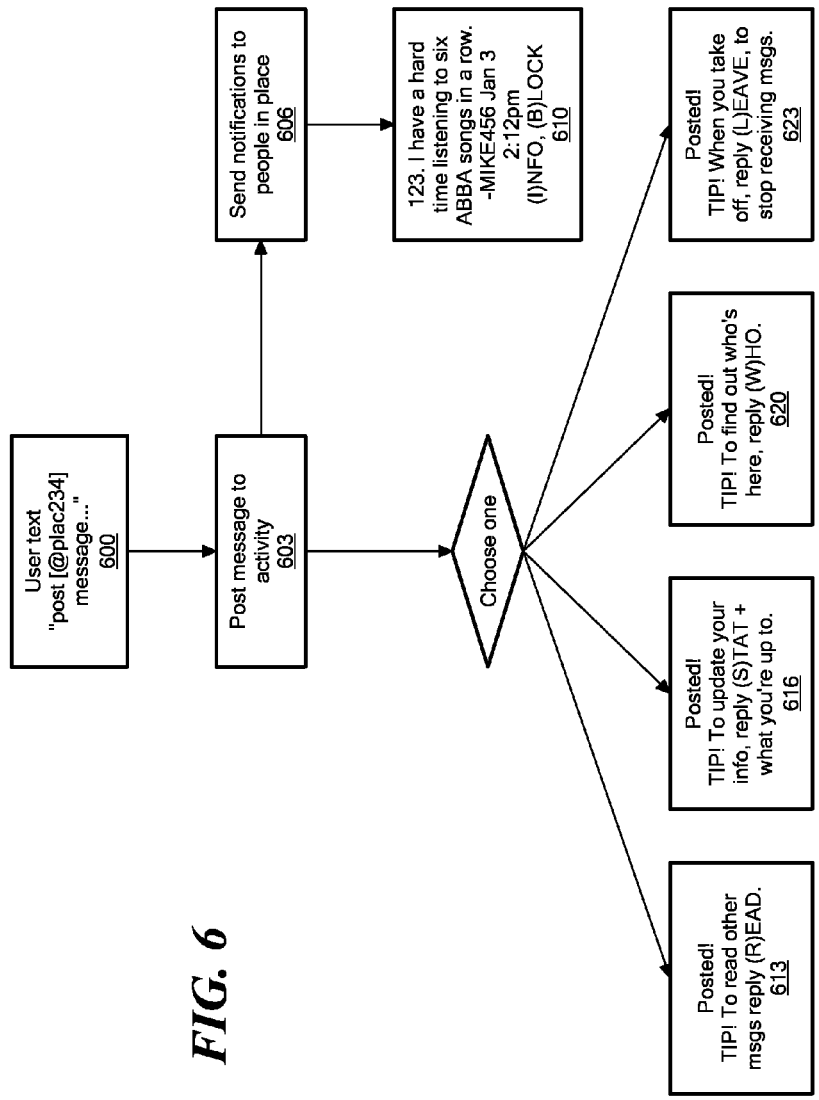
FIG. 6 illustrates logical flow in connection with an embodiment of the present invention by which a user, having logged in to the physical location's proxy in the manner of FIG. 4, can post a message to the activity at the physical location.

FIG. 6 illustrates logical flow in connection with an embodiment of the present invention by which a user, having logged in to the physical location's proxy in the manner of FIG. 4, can post a message to the activity at the physical location. The user sends in the reply message the command "post 600" with the message to be posted. The system responds by posting the message 603 to activity associated with the location's proxy and then sends notifications 606 and 610 to those users who have logged in to the proxy for the location (boxes in the right-hand portion of the figure) and also selects one of four messages 613, 616, 620 or 623 to send to the user, each message informing the user of the posting and offering a specific tip to the user for use of the system.

Figure 7:
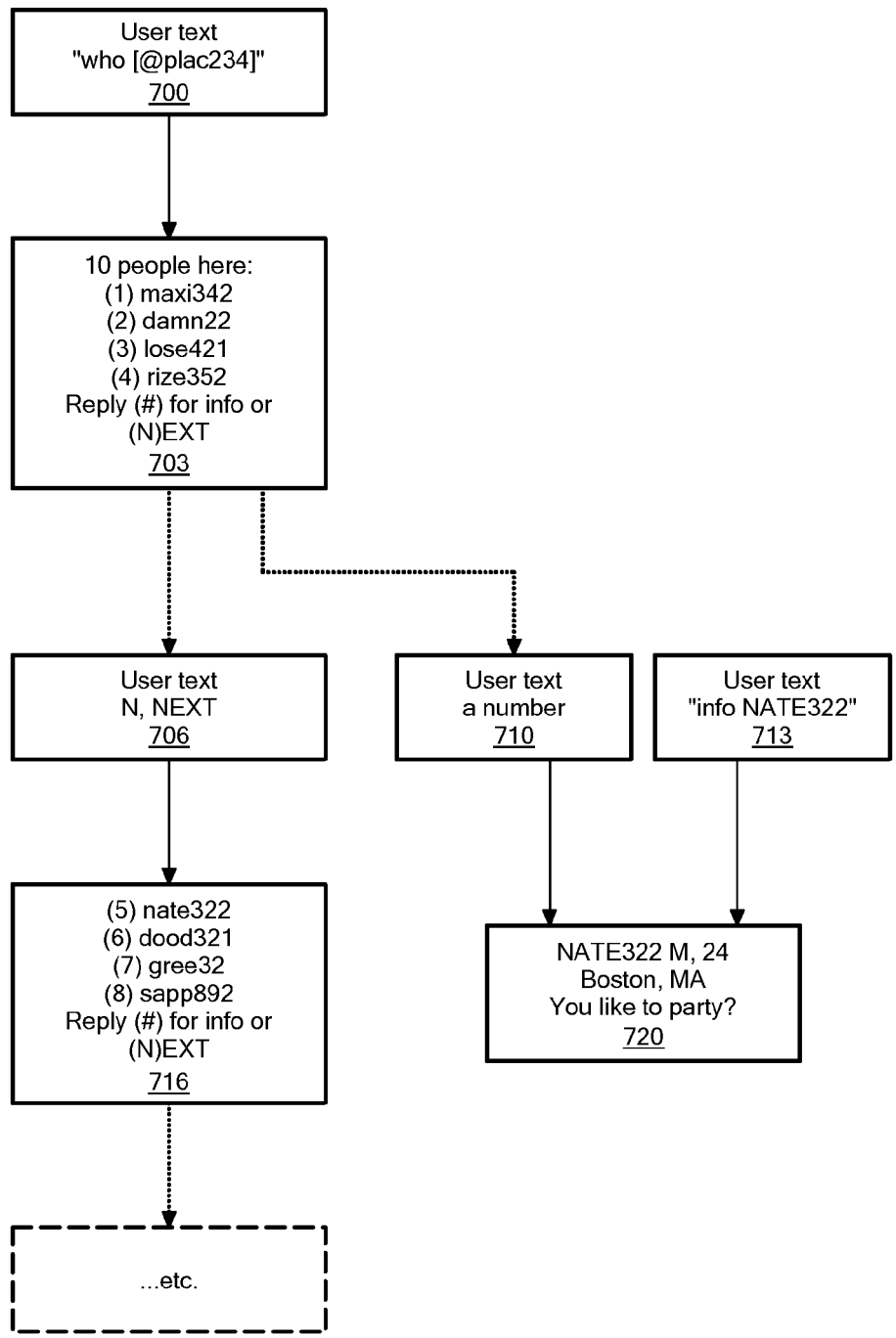
FIG. 7 illustrates logical flow in connection with an embodiment of the present invention by which a user, having logged onto the physical location's proxy in the manner of FIG. 4, can determine who else is presently logged in to the location's proxy.

FIG. 7 illustrates logical flow in connection with an embodiment of the present invention by which a user, having logged in to the physical location's proxy in the manner of FIG. 4, can determine who else is presently logged in to the location's proxy. The user in a reply message types "who" 700 and the system responds 703 with a message indicating that 10 persons have logged in to the physical location's proxy, lists the first four, and provides instructions to "Reply (#) for info or (N)EXT." Three different scenarios 706, 710 and 713 are indicated. When the user replies with N or NEXT 706, the result is a listing 716 of the next for of the 10 persons, and similar instructions to "Reply (#) for info or (N)EXT." Alternatively a user may send a reply 710 with the message giving the number of the person on the list or the reply 713 message be "info nate322," where "nate322" is the user name of the person for which information is sought; in either case, information about this person is returned 720 by the system in a message.

Figure 8:
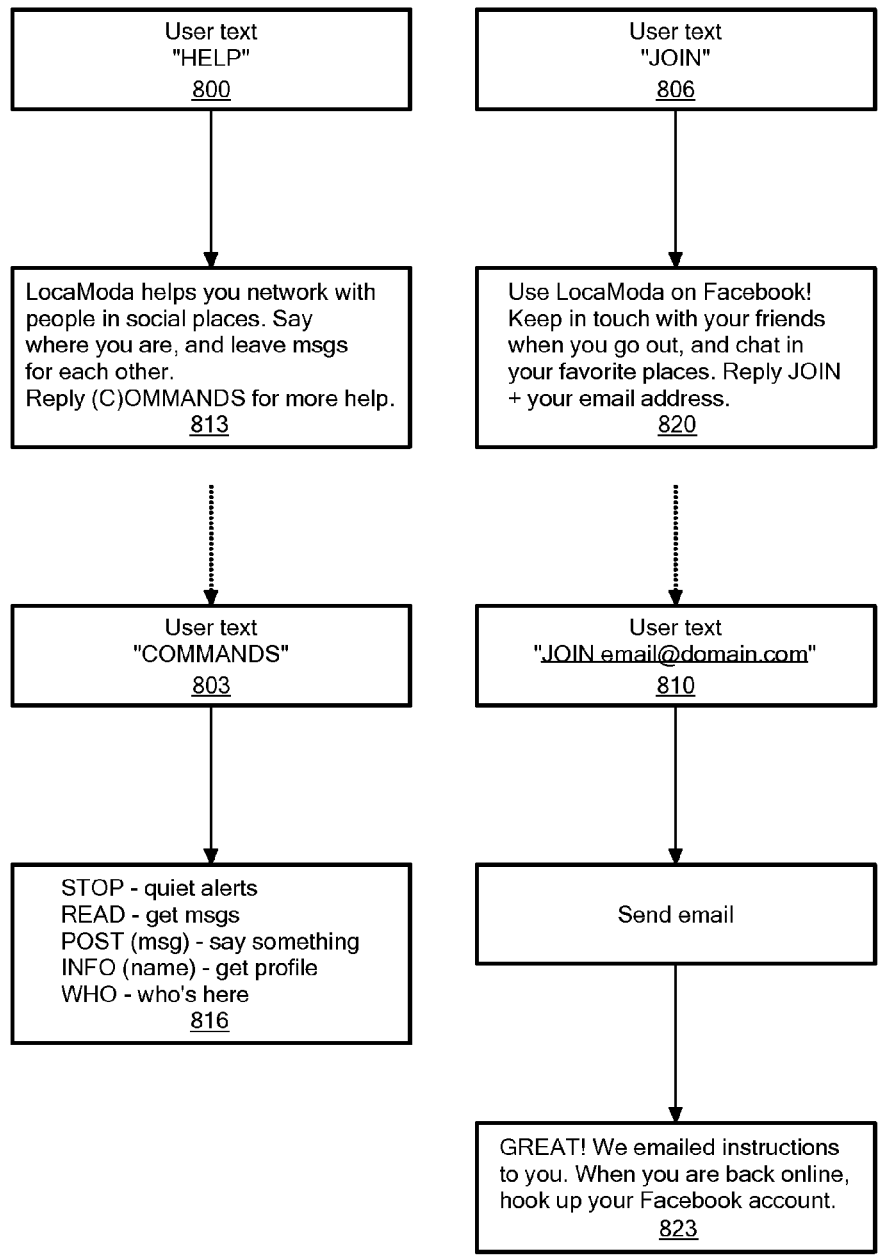
FIG. 8 illustrates other functionality (namely, HELP, COMMANDS, and JOIN), in connection with an embodiment of the present invention, that may be invoked by a person using a personal communication device who, in the manner of FIG. 4, has logged in to the physical location's proxy.

FIG. 8 illustrates other functionality (namely: HELP 800, COMMANDS 803, and JOIN 806 and 810), in connection with an embodiment of the present invention, that may be invoked by a person using a personal communication device who, in the manner of FIG. 4, has logged in to the physical location's proxy. In each case the text message is followed by the system response 813, 816, 820 and 823, respectively.

FIG. 9 illustrates further functionality (such as contests or sweepstakes, and FORTUNE) in connection with an embodiment of the present invention, that may be invoked by a person using a personal communication device who, in the manner of FIG. 4, has logged in to the physical location's proxy. In the first example, when the user replies 900 to a message with the text "WIN," the system responds 903 that the user has entered into a sweepstakes associated with the location. In the second example, when the user replies 906 to a message with the text "FORTUNE," the system responds 910 with a message providing the user with a fortune prediction.

Figure 10:
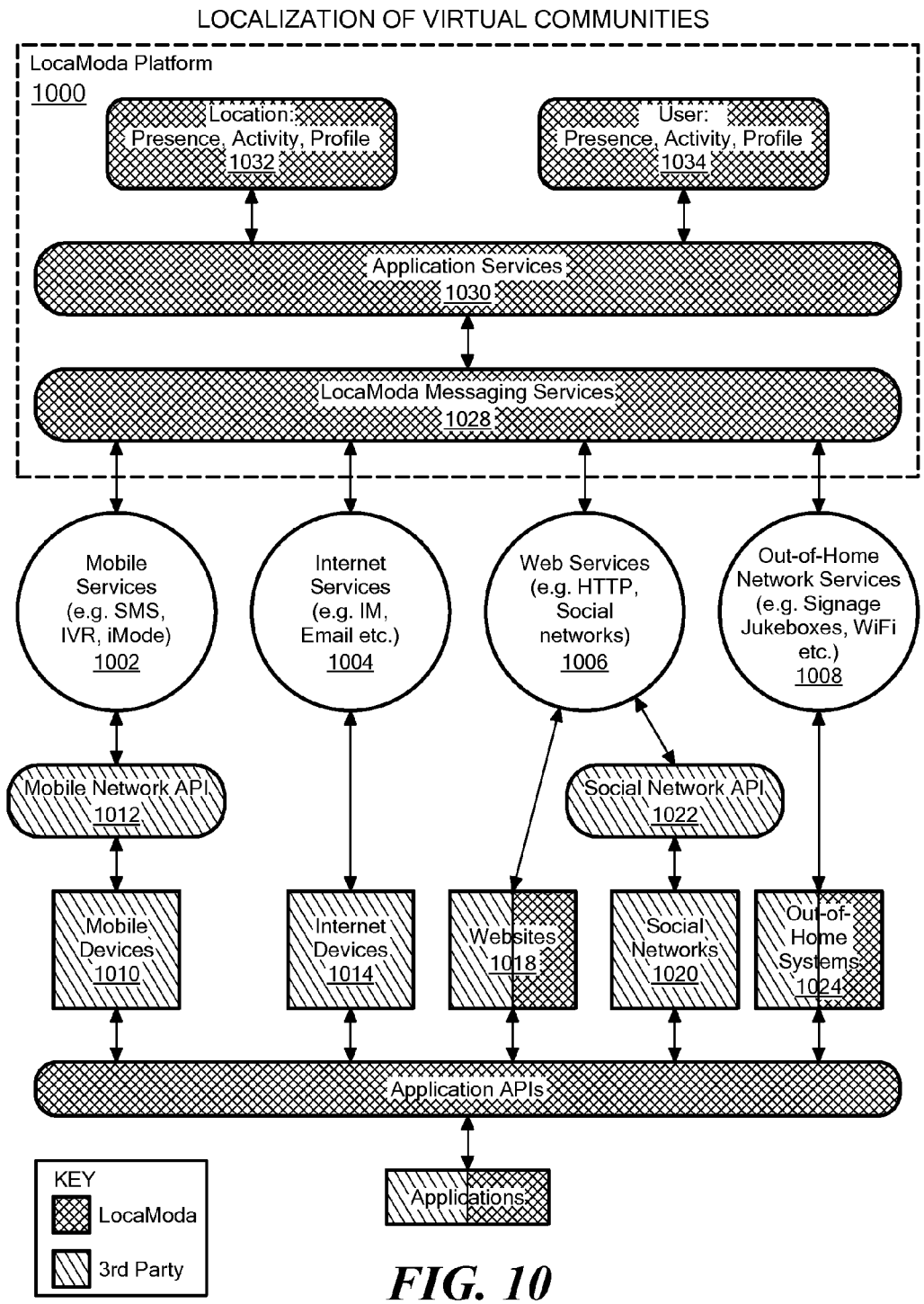
FIG. 10 is a schematic block diagram illustrating architecture of an embodiment of the present invention in relation to communication infrastructure that includes virtual community web sites (here called social networks) and various communication devices and services.

FIG. 10 is a block diagram illustrating architecture of an embodiment of the present invention in relation to communication infrastructure that includes virtual community web sites (here called social networks) and various communication devices and services. The architecture includes a platform 1000 connected to one or more services, exemplified by a mobile service 1002 (such as a short message service (SMS), interactive voice response (IVR), iMode, etc.); an Internet service 1004 (such as instant messaging (IM), e-mail, etc.); a web service 1006 (such as HTTP, social networks, etc.); and an out-of-home network service 1008 (such as signage, jukeboxes, WiFi, etc.). A variety of devices and networks communicate with associated services via appropriate interfaces, as needed. For example, mobile devices 1010 communicate via a mobile network API 1012 with the mobile services 1002. The mobile devices 1010 may, for example, send text messages (such as SMS messages) through the mobile services 1002 to the platform 1000. Internet devise 1014, such as PCs, may send messages via the Internet services 1004 to the platform 1000, as discussed in relation to FIGS. 4-9. Web sites 1018 and social networks (such as Facebook) may communicate (via APIs 1022, if necessary) with the platform 1000. Out-of-home systems 1024, such as displays disposed at physical locations, may communicate via the out-of-home network services 1008 with the platform 1000. The platform 1000 may cause contents to be displayed on the out-of-home systems 1024, and users may interact with the out-of-home system 1024, such as by sending messages from their mobile devices 1010 or PCs 1014, as described in our PCT Application referenced above.

The platform 1000 includes appropriate messaging services 1028, by which the platform 1000 communicates with the services 1002-1008. The platform 1000 also includes application services 1030. The platform 1000 also includes location services 1032 and user services 1034. The location services 1032 accept, store and provide information about physical locations and their corresponding proxies. This information may include presence information, i.e., information about individuals who are present at the physical locations or logged in to the locations or their proxies. Users log in by sending messages to the proxies. Also included is information about activities taking place or scheduled to take place at the physical locations, and profile information about the physical location and its proxy, such as street address, telephone number, short code (to which messages are sent), links to fans and the like.

The user information 1034 contains presence information, such as the location(s) to which a user is logged in, a physical location where the user is physically present, and the like. The user information 1034 also includes activity information, such as activities the user is interested in or is participating in. Profile information includes name, interests, age and the like.

When a message, such as a text message, arrives from a user's mobile telephone, the message metadata typically includes the sender's telephone number. If the user's telephone number is stored in a user's social network 1020 entry, the system may query the social network 1020 with the user's telephone number to obtain information about the user, such as the user's name, nickname, image, avatar, home city, etc. and display some or all of this information along with a text message, game move or other contents sent by the user. Similarly, if the user registered with a jukebox and provided his/her telephone number, when the user logs on to the jukebox, the system may use the telephone number associated with the jukebox user to identify the user and query the user's social network 1200 record or update the user's social network (such as Twitter) record to indicate the song the user is currently playing on the jukebox.

In general, once the system identifies a user, such as by the user's telephone number, the system may obtain information about the user, such as from the user's social network record. The system may aggregate this information with similarly obtained information about other users to determine or refine a demographic profile of patrons of the establishment where a corresponding screen is located. Thus, the system may maintain a dynamic profile of the establishment. This profile may be used to specify or alter content attributes associated with the screen and, thereby, determine or influence contents, such as advertisements, displayed on the screen.

Contexts in which embodiments may be advantageously used are not limited to bars and ice cream parlors, nor to video display screens. For example, an offer, such as "2-for-1 popcorn," may be displayed on a projection screen in a movie theater, along with a screen-specific short code to which a user may send a text message in order to take advantage of the offer. The received telephone number of the user's telephone may then be used to identify the user as attending a particular showing of a particular movie. This information may be used to target the user with advertising deemed to be consistent with the movie genre, etc. In general, location-specific screens (and, as in the case of the movie screen, time-specific screens) may thus be used to identify users who find the screens' contents or location of interest.

Figure 21:
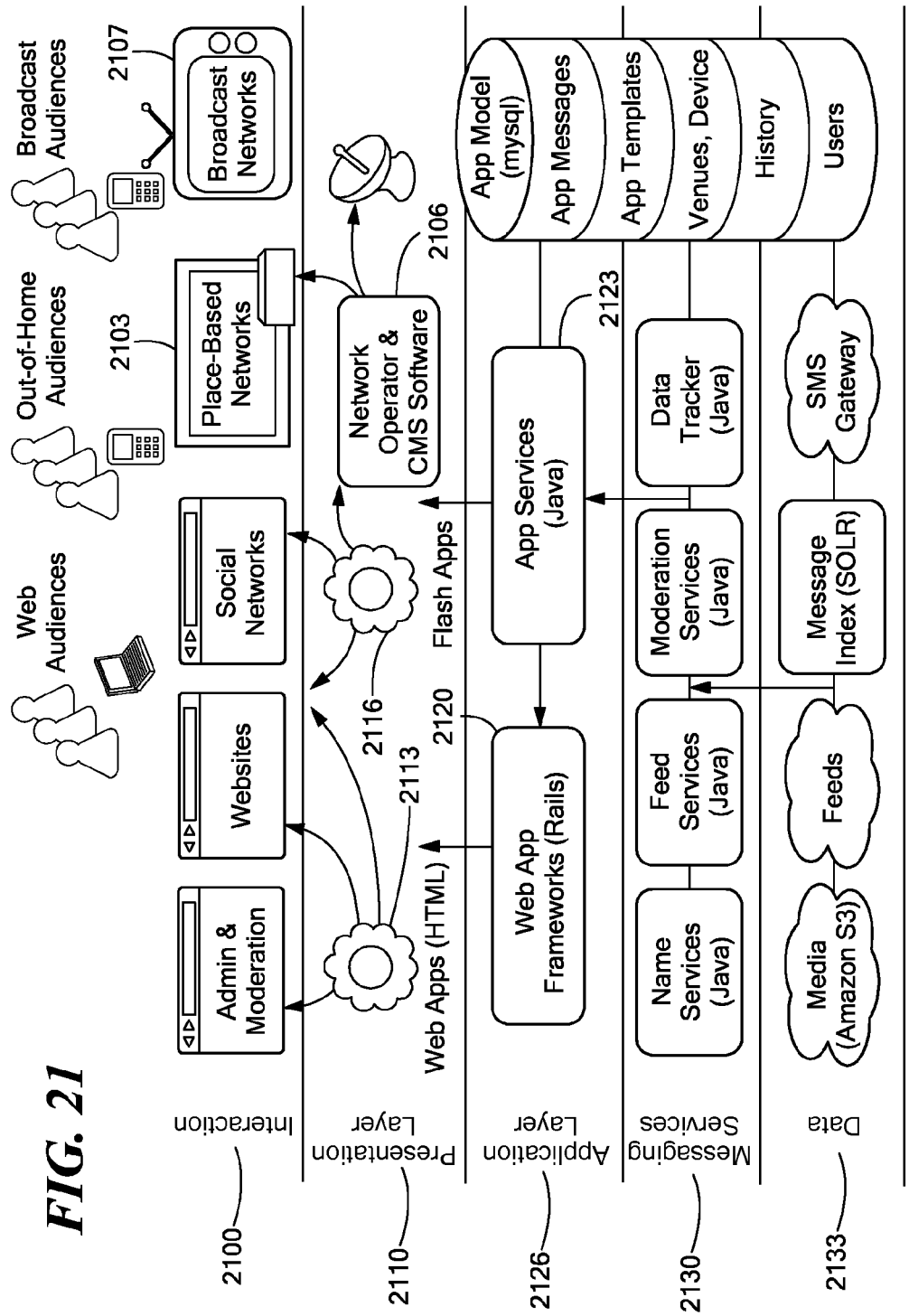
FIG. 21 is a schematic block diagram illustrating architecture of an embodiment of the present invention.

FIG. 21 is schematic block diagram illustrating architecture of an embodiment of the present invention showing a variety of interaction modes 2100. The display screens discussed herein can be parts of some of these interaction modes 2100. For example, a fixed display screen 2103 in an establishment may be part of a place-based network that includes a content management system 2106. An exemplary place-based network is the Barfly Interactive Network provided by TouchTunes Corporation, New York, N.Y. Another example of a fixed, typically large format, display screen is a screen coupled via a computer to the Internet. Yet another example of an interaction mode 2100 is a television 2107 coupled to receive a television network broadcast. It should be noted that a Flash or other presentation layer application may display different contents each time a television program is broadcast. Thus, a rebroadcast of a "repeat" television show, such as one that invites viewers to cast votes for a favorite performer or candidate in a debate by sending text messages or placing telephone calls, may be made more interesting by displaying then-current contents. Other examples of interaction modes 2100 include juke boxes, game systems and point-of-sale kiosks (not shown).

A presentation layer 2110 may include a web application 2113 or a Flash application 2116 being executed by hardware associate with one of the interaction modes 2100. The application may subscribe to content published by an application 2120 or 2123 in an application layer 2126 using a well-known subscriber-publisher model. For example, an administrator may specify content attributes to the application 2113 or 2116, such as via an administrative interface (not shown), and the application 2113 or 2116 may then subscribe to the publisher 2120 or 2123 for the specified contents. (As noted, optionally or alternatively, the system may automatically determine content attributes to for the application 2113 or 2116.) When appropriate contents are obtained, the publisher 2120 or 2123 sends the contents to the presentation layer application 2113 or 2116 for display. The application layer applications 2120 and 2123 utilize other components in other layers 2130 and 2133, as well as data in a database 2136, as shown.

A different presentation layer application 2113 or 2116 may be used for different screen types and, consequently, different content attributes or parameters may be used for different screens. For example, a large screen in Time Square, New York may display sports related messages, with a preference for pro-Yankees related contents, whereas screens in Boston may preferentially display pro-Red Sox contents. Screens co-located may display contents using similar or identical content attributes, but with different display parameters, such as the maximum number of message that may be simultaneously displayed depending, for example, on the size of the screen. Thus, for example, more messages may be displayed on a large screen in a bar than on the screen of a jukebox in the bar.

Figure 11:
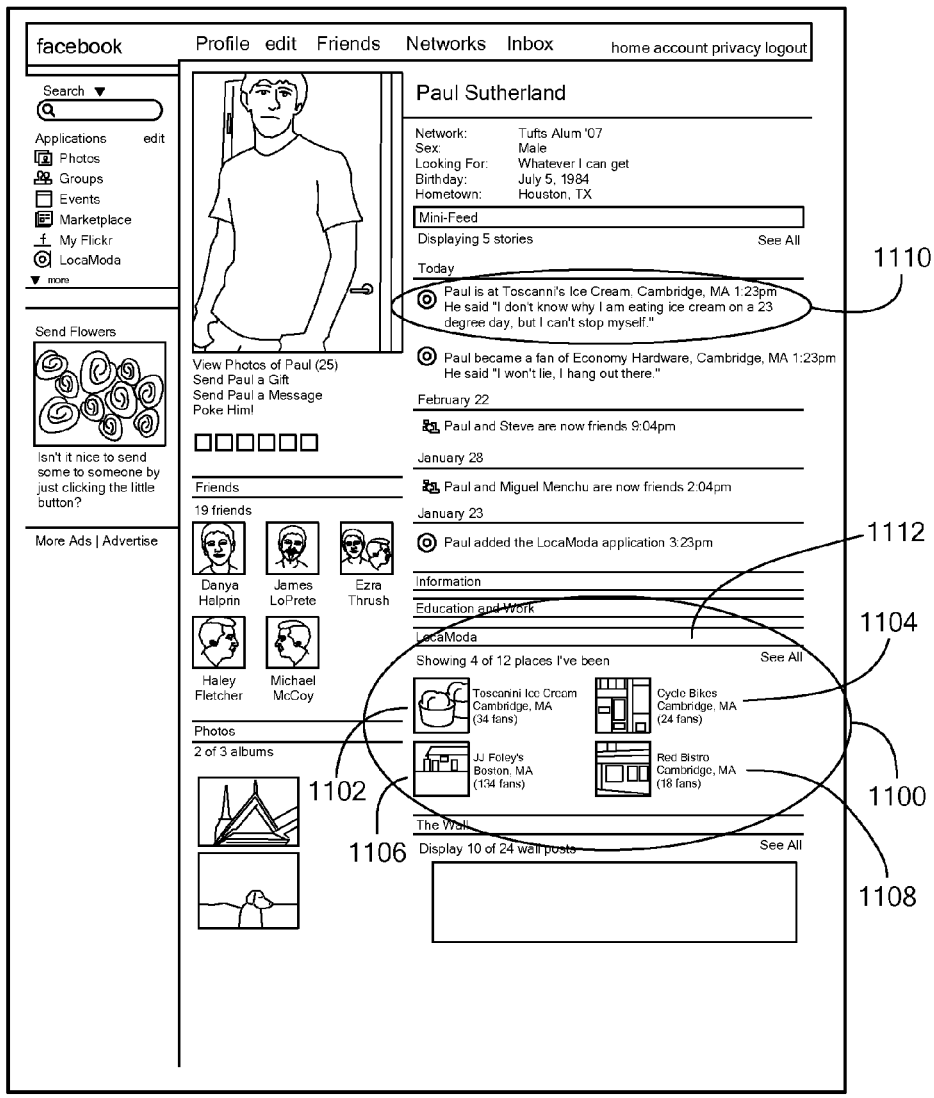
FIG. 11 is a replica of a web page of an individual from a virtual community web site, here represented as that of Facebook, showing how, in accordance with an embodiment of the present invention, there may be associated with the web site a user's activity in relation to a number of physical locations.

FIG. 11 is a replica of a web page of an individual from a virtual community web site, here represented as that of Facebook, showing how, in accordance with an embodiment of the present invention, there may be associated with the web site a user's activity in relation to a number of physical locations. A portion 1100 of the web page may display a scrollable list of proxies for physical locations that the individual has recently logged in to. For example, the individual identified on the web page has recently logged in to Toscanini Ice Cream 1102, Cycle Bikes 1104, JJ Foley's 1106 and Red Bistro 1108. For each physical location 1102-1108, an icon and information, such as location and number of fans, may be displayed. ("Fans" are individuals who have subscribed to a physical location, without necessarily completing a mutual-approval process. In some virtual communities, fans may subscribe to individuals, films, bands, public figures, businesses, products, etc.) The web page may also display postings made by the individual, as indicated at 1110.

Figure 12:
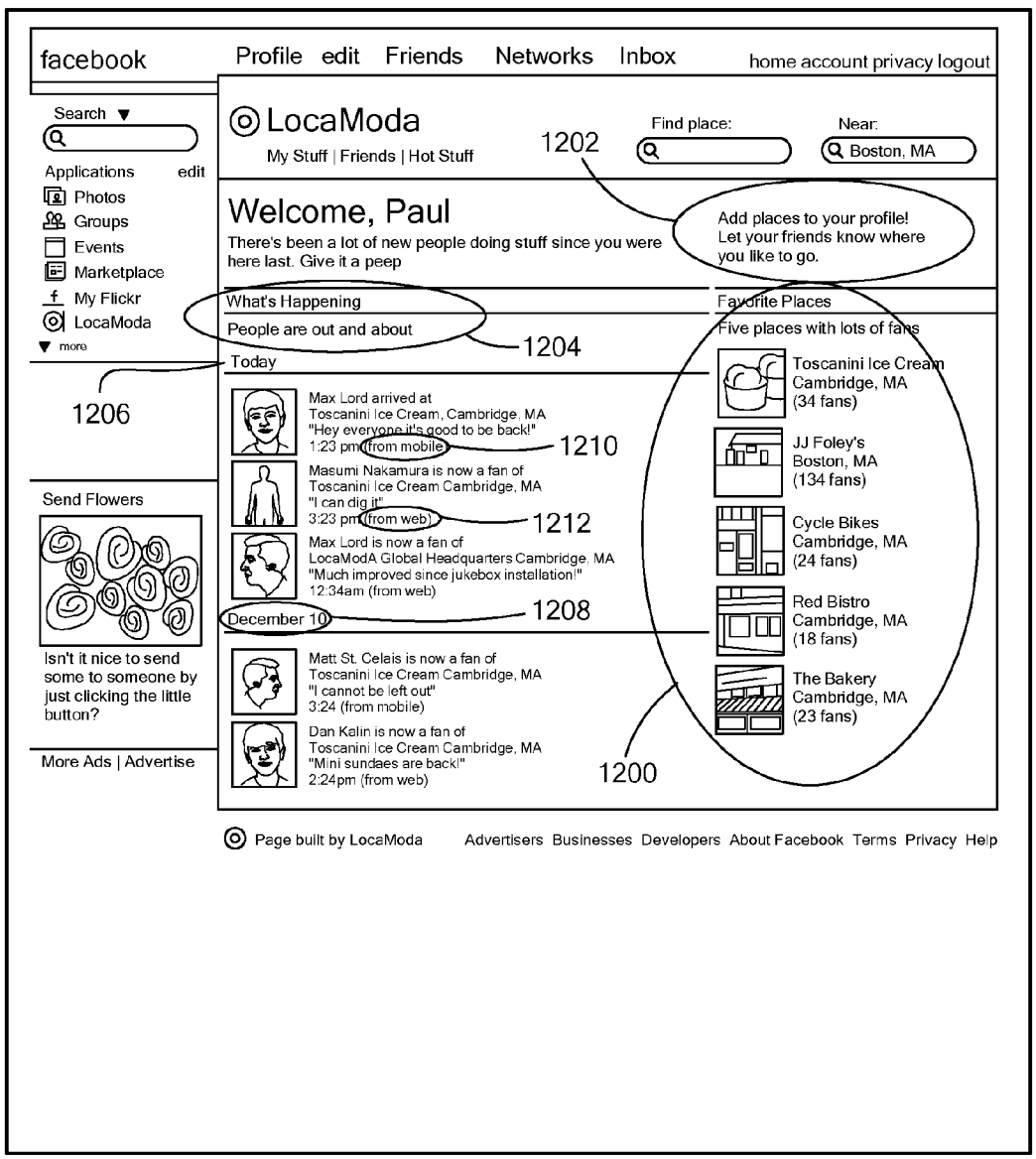
FIG. 12 is a replica of a web page, linked to the web page of FIG. 11, by which, in accordance with an embodiment of the present invention, among other things, activities at the physical locations can be indicated to the user.

Additional information about a physical location may be accessed by invoking a link 1112 on the web page to cause a subsequent web page, an example of which is shown in FIG. 12, to be displayed. FIG. 12 is a replica of a web page, linked to the web page of FIG. 11, by which, in accordance with an embodiment of the present invention, among other things, activities at the physical locations can be indicated to the user. A list of physical locations that have been identified by the individual as being of interest ("Favorite Places") may be displayed, as shown at 1200. An icon and information about each location (as described above) may be displayed. The web page may encourage the individual to add physical locations to the individual's profile, as exemplified at 1202, to increase the likelihood of the system identifying an activity or another individual that may be of interest and present in a physical location that is listed in the profile.

The web page may also display a list 1204 of other individuals who are currently, or have recently been, present at physical locations that are of interest ("Favorite Places"). This list may include real-time information and/or information about a near-term time frame, such as "Today" 1206 and/or information about past time frames, as exemplified at 1208. For each individual included in the list, the information may include a photograph, an icon, an avatar or the like, as well as the time the individual arrived at the physical location or logged on to the physical location, a copy of a post made by the individual and its time and an indication of how the post or logon was accomplished, such as via a mobile device 1210 or via the web 1212.

Figure 13:
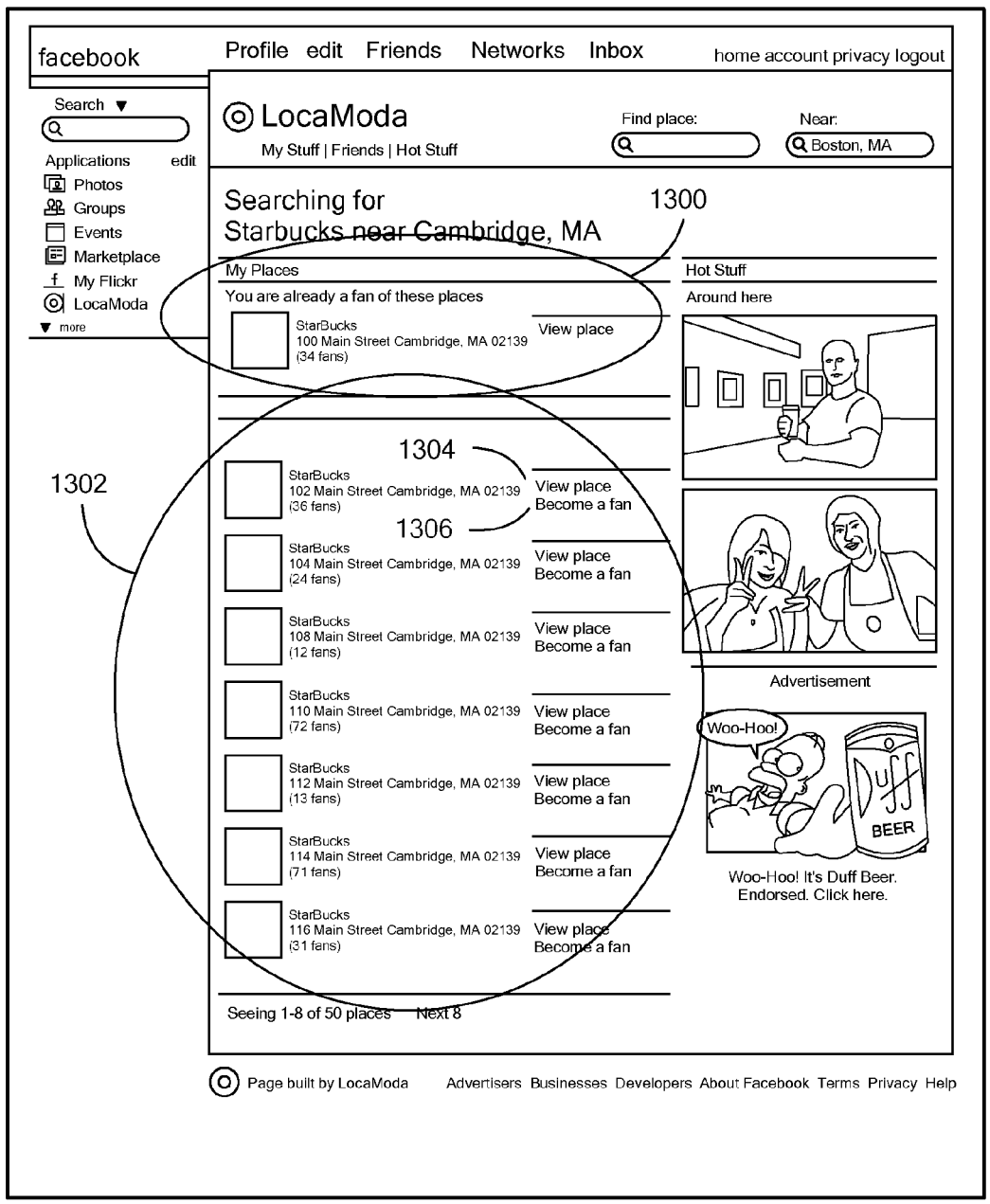
FIG. 13 is a replica of a web page, in accordance with an embodiment of the present invention, showing the result of a search for web pages for proxies of physical locations near a given city.

A user may search for physical locations, based on various selection criteria, such as location, type of service or product offered at the location, hours of operation, the presence of other identified individuals present or logged on to the location and the like. FIG. 13 is a replica of a web page, in accordance with an embodiment of the present invention, showing the result of a search for web pages for proxies of physical locations near a given city. If any of the resulting physical locations are listed in the searching individual's Favorite Places, these locations may be listed separately, as indicated at 1300. Other resulting physical locations may be listed simply as "Places" 1302. For each physical location, information, such as address and number of fans, may be displayed. The list may include links to facilitate viewing detailed information about a physical location 1304 and becoming a fan of the physical location 1306.

Figure 14:
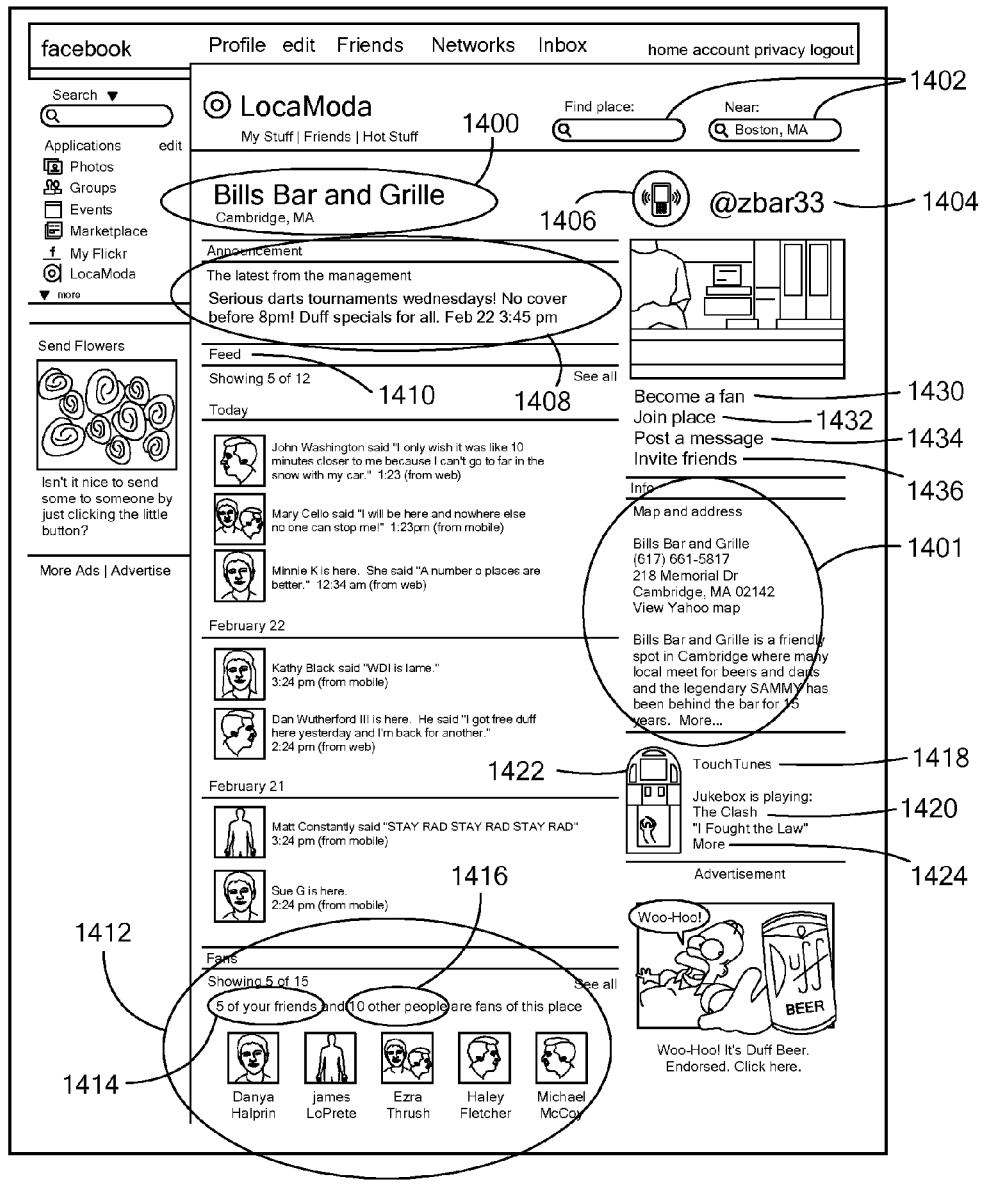
FIG. 14 is a replica of a web page, in accordance with an embodiment of the present invention, for a proxy of a particular physical location.

Detailed information about a physical location may be displayed, such as by invoking the link 1304 shown in FIG. 13. FIG. 14 is a replica of a web page, in accordance with an embodiment of the present invention, for a proxy of a particular physical location. The web page may include information about the physical location, such as its name, telephone number and address 1400 and 1401. Search criteria may be entered via one or more fields 1402.

The web page may also display an electronic address (a "loca"), exemplified by 1404, by which a user may interact with the proxy. Such interaction may take a variety of forms, including logging in to the proxy, posting messages to the proxy, interacting with activities (such as a jukebox) taking place at the physical location or on its proxy and the like, as exemplified in FIGS. 4-9. This electronic address may be any type of address that may be used to send a message. In the example depicted in FIG. 14, the address is a "short code" SMS (short message service) address, to which a text message may be sent, such as from a mobile telephone or Internet-connected computer. Other types of addresses include telephone numbers and e-mail addresses. As described below, users may also send commands, such as to associate a "tag" (described below) with a display screen.

The web page may include an icon 1406 which, when invoked, displays a separate window (not shown) for accepting a message and then sending the message to the address 1404, without requiring a user to manually activate a separate application program or use a separate device, such as a mobile telephone. The separate window may provide the user several options, such as "Log on," Log off," "Post," "Tag" and the like. Alternatively, activating the icon logs the user on the physical location or toggles the user's current logged-on state at the physical location.

The web page may display messages of general interest, as exemplified at 1408. The web page may also include a link 1430 for becoming a fan of the physical location, a link 1432 for joining the location, a link 1434 for posting a message to the location, and a link 1436 for inviting a friend to visit the location.

The web page may display a list of current and recent postings 1410 to the physical location by individuals. As discussed above, each of the entries in the list may include information about the individual who posted the message, including information about whether the posting was made from a mobile device or from the web. The web page may also display a list of fans 1412 of the physical location. This list may include all such fans, or the list may include fans who also match a selection criterion, such as friends of the individual performing the query. The web page may provide information 1414 and 1416 about the number of fans who fall within each category. As discussed below, the web page may also display contents automatically obtained by the system, as well as an indication of the source of the contents.

The web page may list activities, services, products, devices, etc. (collectively "activities") available or located at the physical location. An example activity, a jukebox, is depicted at 1418. Information about the current state of the activity, such as the current song being played on the jukebox 1420, may be displayed. The activity display may include an icon 1422, by which the user may interact with the activity. For example, invoking the icon 1422 may enable the user to select a song to be played on the jukebox and, optionally, arrange for payment for the song, such as by credit card or by accessing an account maintained by the physical location. Other information, such as a list of recently played songs, a list of available songs, or a request to add or remove a song from the list of available songs, may be displayed in response to invoking another link 1424.

Other examples of activities include special events, such as a sales promotion for a particular brand of beer, karaoke night or entertainment of a particular type (movie, band, comedian, etc.) or by a particular entertainer. Invoking the icon for an activity may enable a user to sign up for the associated activity, including possibly reserving a seat or table.

Figure 15:
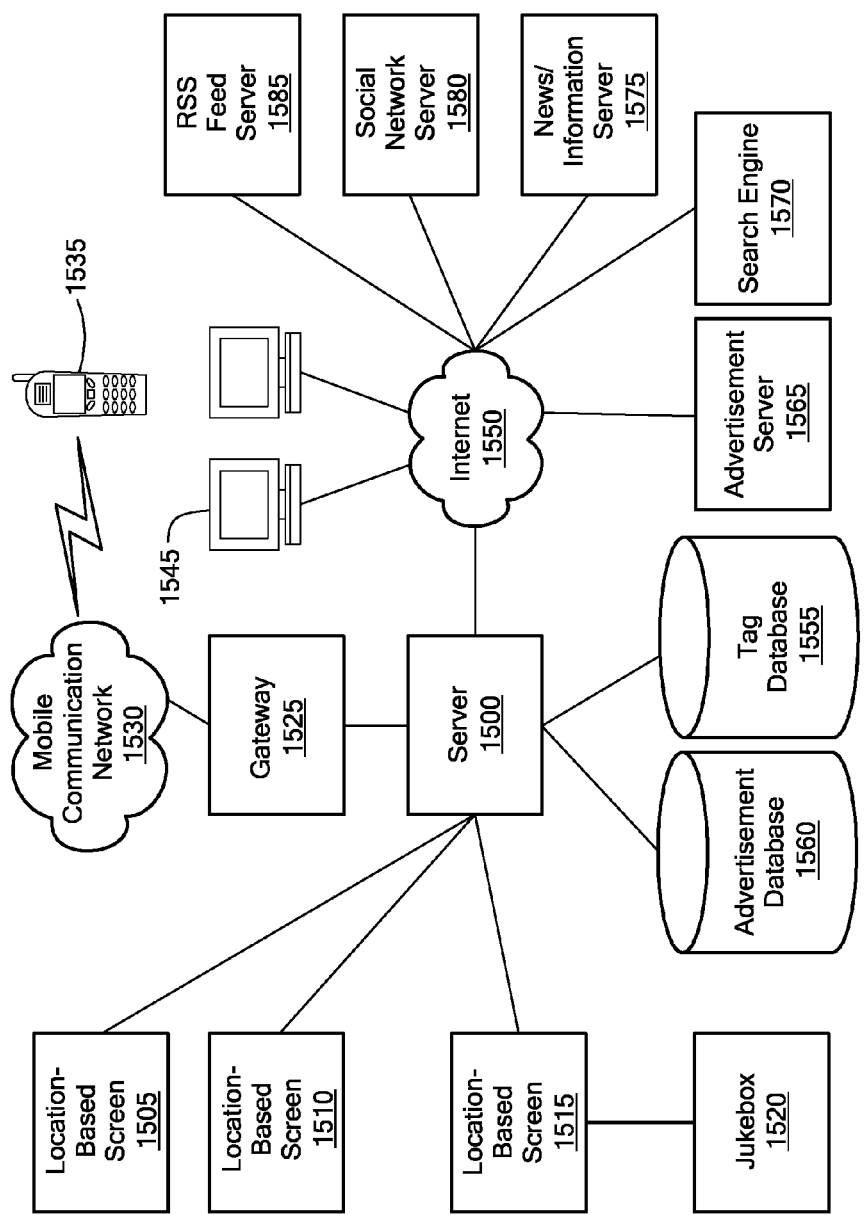
FIG. 15 is a schematic block diagram of another embodiment of the present invention.

FIG. 15 is a schematic block diagram of another embodiment of the present invention. A server 1500 controls one or more location-specific display screens, exemplified by screens 1505, 1510 and 1515. Other numbers of screen may, of course, be used. The screens may be located at venues where people congregate, such as ice cream parlors, bars, clubs, athletic clubs, book stores and the like. The venues may be public or private. Optionally or alternatively, the screens may be located at events, such as trade shows, conferences, sporting events, movie openings, weddings, family reunions, etc. The events may be public or private. In some embodiments, selected ones of the screens 1505-1515 may be viewed by a community of individuals at the venues where the screens are located. One or more of the screens 1505-1515 may be co-located with other devices, exemplified by jukebox 1520, that are involved in activities, such as playing songs, associated with the locations of the screens 1505-1515. In some embodiments, the one or more of the screens 1505-1515 are the screens in the other devices. In such cases, the server 1500 communicates with the other device(s) to provide screen contents, such as using the subscriber-publisher model discussed above. Other exemplary devices (not shown) that represent events include electronic games (such as darts and pinball) and computers or databases that store information about activities (such as performances by musicians, get-togethers to watch a sporting event in person or on a television screen or to celebrate a team's victory) that have no other physical embodiments.

The server 1500 is coupled via a gateway 1525 to a wireless communication network 1530, such as a mobile telephone network. Users of mobile communication devices, exemplified by mobile telephone 1535 may communicate with the server 1500, such as by placing telephone calls, sending text messages or sending e-mail messages to the server 1500, as described in one or more of the incorporated patent applications. As a result, users of the mobile communication devices 1535 may cause messages to appear on selected ones of the screens 1505-1515. The server 1500 also includes a web server 1540, by which contents displayed on the screens 1505-1515 are served as web pages and are, therefore, accessible by browsers being executed by computers, exemplified by computer 1545, connected to the server 1500, such as via the Internet 1550.

The server 1500 maintains a tag database 1555, in which the server stores one or more tags associated with each of the screens 1505-1515. The tags are used to identify content attributes associated with the respective screens 1505-1515. A system administrator or proprietor of one of the screens 1505-1515 may associate one or more tags with ones of the screens to indicate one or more types of contents desired to be displayed, or desired not to be displayed, on the respective screen 1505-1515. Thus, the tags may provide a rule base for determining the contents to be displayed on the screens 1505-1515.

Optionally or additionally, users may send messages to the server 1500 to add tags to the tag database 1555. The users may send the commands by any suitable mechanism, such as by sending a text message to an address associated with the screen 1505-1515 of interest. (Addressing messages is described in an incorporated patent application.) An exemplary command is a short message service (SMS) message whose contents are "TAG ZEPPELIN." Commands may also be sent as e-mail messages from mobile communication devices 1535 or from computers, such as computer 1545. It should be noted that the users may, but need not, be present in the location of the screen, to which the user directs a message. For example, the user may be home, but the user may be interested in activities at a particular location. The user may use his/her computer 1545 to browse the contents of a screen 1505-1515 located at a particular venue, such as Toscanini's ice cream, because the user is considering going to the venue and wishes to first discover what is happening there, or the user is unable to go to the venue but nevertheless wishes to at least virtually participate in activities being undertaken there.

As noted, users may cause messages to be displayed on the screens 1505-1515, such as by sending the messages to the server 1500. Optionally or alternatively, the server 1500 may automatically parse contents displayed on the screens 1505-1515 and identify tags, based on the displayed contents. For example, if a user caused a message, such as "I love the Red Sox," to be displayed on the screen 1515 (hypothetically located at The Harp bar), the server 1500 may use automatic discovery mechanisms or other well-known techniques to identify key words, such as "Red Sox," and then associate these key words with the screen 1515 and add the tags to the tags database 1555. Thus, the types of contents identified by the tags may dynamically change, as users post messages on the screens 1505-1515.

As noted, automatically obtaining contents and displaying the contents on the screens 1505-1515 may ensure the displayed contents are "fresh," i.e., change frequently, thus providing contents that are interesting even to a relatively static audience, even if the audience does not contribute, or contributes little, to the contents.

The tags provide selection criteria for contents to be displayed on the screens 1505-1515, i.e., a "profile" of the types of content desired to be displayed on the respective screens. Exemplary tags identify a location of the associated screen (such as state, city, neighborhood, street, zip code or telephone area code), a venue type of the location (such as ice cream parlor, bar, night club, book store or barber shop), demographic information about expected viewers of the screen (such as age, income, ethnicity, education level or political inclination), activities currently under way at the location (such as song being played on a jukebox 1520, group activity (ex. karaoke, open microphone comedy or darts) and the like. Table 1 exemplifies tags that might be associated with a set of hypothetical screens.

TABLE 1

| Screen | Tag(s) |
|---|---|
| 1 | Location = Toscanini's, Central Square |
| | Location = Cambridge, Massachusetts |
| | Location = area code 617, 857 |
| | Demographic = age 18-35 |
| | Demographic = income 10,000-75,000 |
| | Venue-type = ice cream parlor |
| 2 | Location = The Harp |
| | Venue-type = bar |
| | Current-song = Stairway to Heaven |
| | Current-artist = Led Zeppelin |
| | Interests = sports, Red Sox |

The tags may be changed based on the time of day, day of week, etc. For example, where an establishment caters to families during the day and to hip-hop music fans during the night, one set of tags may be used during the day and a different set of tags may be used at night. Thus, each tag may have a timeframe associate therewith. Consequently, RSS and other types of data feeds may be made time specific, at least with respect to what content is displayed.

The server 1500 may also maintain an advertisement database 1560, which stores advertisements or pointers to advertisements that are to be displayed on the screens 1505-1515. The advertisement database 1560 may also contain criteria for selecting advertisements that are to be displayed, based on tags associated with the screens 1505-1515. For example, sporting goods may be advertised on screens that have an Interest tag that includes "sports" or a particular sports team. Based on a screen's current set of tags, the server 1500 may select one or more advertisements from the advertisement database 1560 and display the selected advertisement(s) on the screen. The advertisements may be fetched from an advertisement server 1565. The advertisement server 1565 may include classified advertisements, advertisement video sequences (such as television-type advertisements), text-base advertisements, etc. Of course, the advertisement server 1565 may include several servers, each operated by a different brand, manufacturer, retailer, advertisement agency, etc. Advertisements may, for example, be displayed in an L-shaped (sometimes referred to as a "dog leg") portion of a screen 1505-1515 reserved for advertisements, messages from a proprietor of an establishment, etc.

Figure 16:
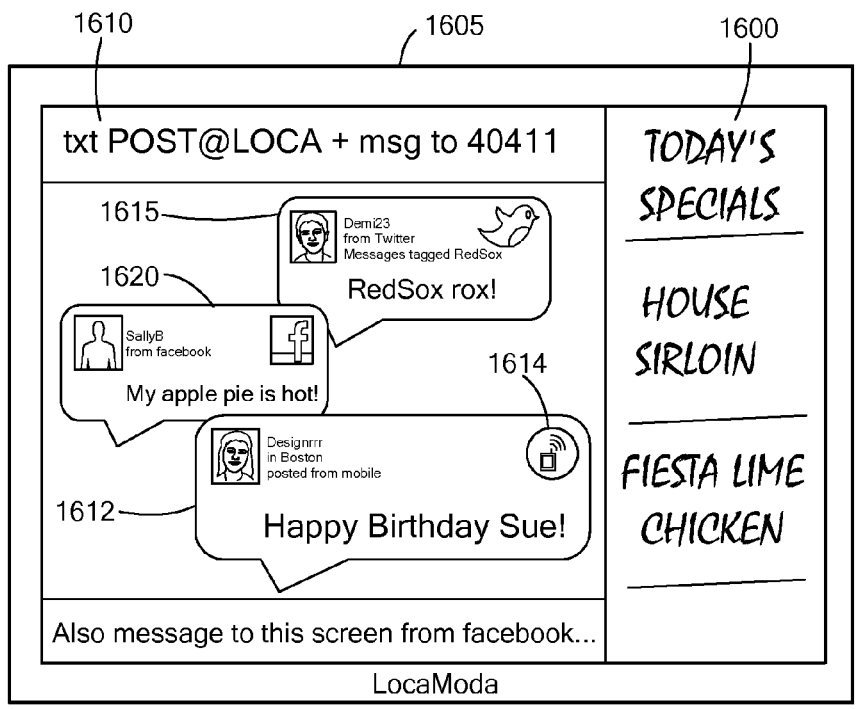
FIGS. 16-20 show various exemplary display screens containing contents obtained from sources, based on tags associated with the screen, in accordance with an embodiment of the present invention.

FIGS. 16-20 show various exemplary display screens containing contents obtained from sources, based on tags associated with the screen, in accordance with an embodiment of the present invention. As shown in FIG. 16, a portion 1600 of the screen 1505-1515 may be dedicated to advertisements, as distinct from the portion 1605 of the screen that displays contents obtained for display. The portions 1600 and 1605 may be dynamically sized, and either portion 1600, 1605 may occupy all or part of the screen.

Returning to FIG. 15, one or more content sources, such as servers connected to the Internet 1550, are accessible to the server 1500, and the server 1500 may obtain contents from one or more of the sources and display the contents on selected screens 1505-1515. Exemplary sources include a search engine 1570 (such as Google); a news, weather, sports, stock and/or other information server 1575 (such as Reuters.com), a social network server 1580 (such as Facebook, Mike, etc.); and a syndicated data feed server (such as a Really Simple Syndication ("RSS") or other protocol feed server) 1585. Other examples include blogs, sports team web sites, product/manufacturer web sites or information aggregator web sites (such as Twitter). (not shown).

Based on a current set of tags associated with a particular screen 1505-1515, the server 1500 may fetch or be provided with contents for the screen. The server 1500 may use some or all of the tags to formulate searches or other types of queries the server sends to one or more of the sources 1565-1585. For example, many social networking systems 1580 include search application programming interfaces (APIs), by which external systems, such as the server 1500, may search for people, messages or other postings or data stored on the systems 1580. The server 1500 may periodically (such as timer-driven) or occasionally (such as based on frequency of user interaction with a given screen) repeat the queries or searches to obtain current contents. Thus, the server 1500 may "pull" contents from the sources 1565-1585. Optionally or alternatively, the server may subscribe to a syndicated data source, such as an RSS feed from a social networking system 1580 or other source 1565-1585, to obtain "pushed" contents.

As shown in FIG. 16, a screen 1505-1515 may display instructions 1610 on how to send a message for display on the screen, such as by sending an SMS message that includes the text "POST@LOCA," plus the message to be displayed, to a screen-specific address, such as an SMS short code (for example 40411). An example of a message from a user so displayed on the screen is indicated at 1612. An icon 1614 may be used to indicate the type of device a user used (in this case, a mobile telephone) to send the message. If the server 1500 displays contents obtained from a source 1565-1585 on the screen, as exemplified by contents 1615 from Twitter and contents 1620 from Facebook, the displayed contents may include an indication (such as a name and/or icon) of the source (ex, Twitter or Facebook), as well as information about a user who generated the contents; an icon, avatar, picture or other graphic associated with the user; the user's ID; and an indication of the tag(s) that caused the contents to be displayed (ex., "Message tagged Red Sox").

Social networking and other systems may include installable applications, such as Wiffiti (available from LocaModa, Inc., Cambridge, Mass.), for sending messages to a user-selected screen 1505-1515, as noted on the screen of FIG. 16.

Figure 17:

As shown in FIG. 17, a user may send still images or video clips for display on a screen. The screen may display instructions (such as "Send your pix to PIX@LOCAMODA.COM") on how to submit images or videos for display. Images and videos may be sent as multimedia messages (MMS). In other respects, sending images and videos is similar to sending text for display on the screens 1505-1515, as described above and in the incorporated patent application.

Thus, user-generated contents (UGC) stored on social networking systems or other sources may be caused to be displayed on screens 1505-1515, based on the location of the screens and/or based on interests, demographics, etc. associated with the screens. In contrast, prior art social networking, etc. systems direct messages to particular people (users) who subscribed to the messages, without regard to location.

A user may cause a message, such as "I love the Red Sox" or "Red Sox rox!" to be displayed on a screen 1505. As noted, as a result, the server 1500 may associate a tag "Interest=Red Sox" with the screen 1505. Subsequently, the server 1500 may search for contents related to the Interests tag and display found contents on the screen 1505. As noted, the server 1500 may subscribe to a feed of information related to the tag. The server 1500 may then display fed contents on the screen 1505.

If a jukebox 1520 sends information related to a currently playing song to the server 1500, the server 1500 may obtain information (such as from iLike.com) about users who are interested in the song, artist, musical style, etc. iLike.com can provides information about users who are currently playing songs. The server 1500 may use this information to display information about the song (exemplified by information 1800 in FIG. 18) on the screen. For example, the server 1500 may use this information to plot (on the screen co-located with the jukebox) a map of where the song being played by the jukebox 1520 is also being played by iLike users. (Not shown.) The server 1500 may obtain lyrics of the song and display the lyrics on the screen. (Not shown.)

Figure 18:
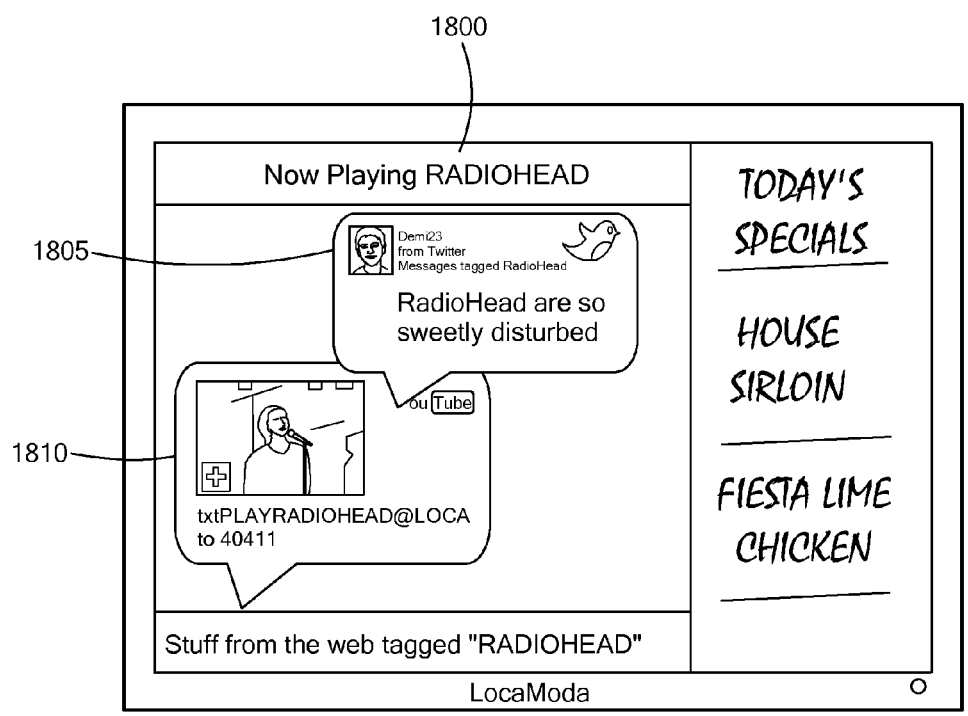

As shown in FIG. 18, messages posted by users in social networking systems, such as iLike, related to a song, artist, musical style, etc., may be obtained by the server 1500 and displayed 1805 on the screen.

As noted, contents may include text, still images, videos and the like. When a video is selected for display on a screen, the server 1500 may display a thumbnail still image and instructions by which a user may cause the video to be played. For example, as a result of the currently playing song on the jukebox, the server 1500 may obtain a video related to the artist (such as from YouTube) and display information 1810 (FIG. 18) about the video on the screen. Instructions to play the video may be "txt PLAYRADIOHEAD@LOCA to 40411" to cause the video to play.

In one exemplary scenario, a user posts a message on a screen 1505 saying, "Looking for Red Sox tickets." As a result, the server 1500 associates a tag "Interest=Red Sox, tickets" with the screen 1505. The server may obtain contents from classified advertisement servers 1565, such as Craigslist.com, and consequently search for, or subscribe to be fed, advertisements offering Red Sox tickets for sale, and the server 1500 may display some or all of these advertisements as contents on the screen 1505. Note that the advertisement content would appear on the screen 1505 in the same location as the user who posted the request message or who is accessing the screen 1505 content via the user's computer 1545. The server 1500 may assign an expiration time to tags, so the server 1500 stops obtaining contents related to one or more tags after a predetermined amount of time or based on other criteria, such as the amount of user activity or other messages related to the tags.

Figure 19:
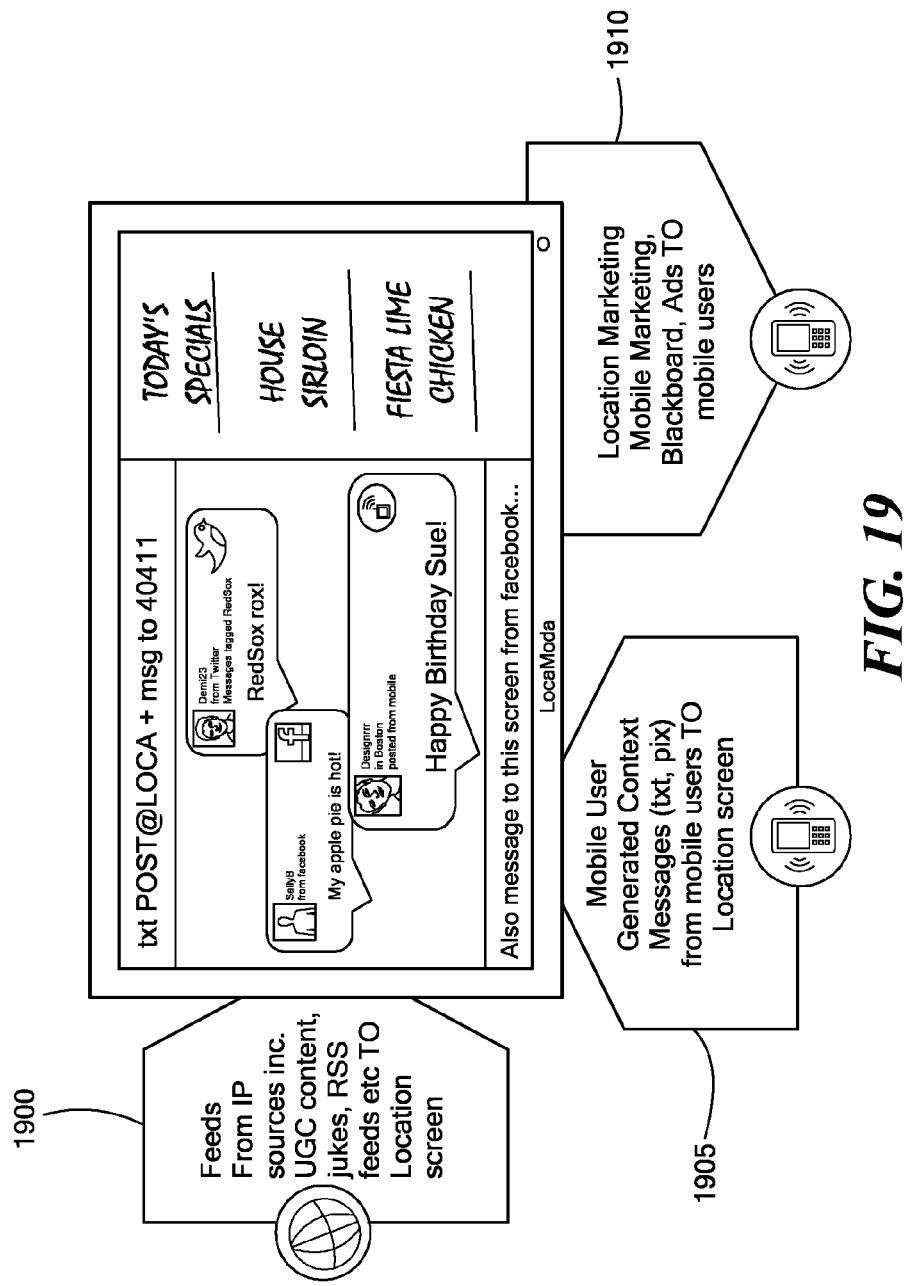

As indicated at 1900 in FIG. 19, contents may be obtained (pushed or pulled) from various sources, such as IP sources on the Internet, including user-generated contents (UGC) and RSS feeds. Contents (text, images, videos, etc.) may also be explicitly sent by users for display on identified screens, as indicated at 1905. Furthermore, advertising may be automatically selected by the server 1500, optionally based on some or all of the tags currently or historically associated with the screen, as indicated at 1910. In addition, because the server 1500 identifies mobile users who send messages for display, and the server 1500 may automatically identify tags or keywords in the messages, the server 1500 may send targeted advertisements (such as text messages or MMS messages) to the mobile users. Similarly, the server 1500 may send targeted advertisements via e-mail to users who send messages to the server 1500 via e-mail for display on a screen.

The volume of contents found by the server 1500, or fed to the server 1500, may greatly exceed the volume of messages users send for posting on the screens 1505-1515. The server 1500 may store rules in the tag database 1555 or elsewhere to rank contents or content sources and use the rankings to select which contents to display on the screens 1505-1515. In one embodiment, messages or other contents sent by users for display on the screens 1505-1515 are ranked (or weighted) very high, likely guaranteeing that the messages will be displayed. Alternatively, the server 1500 may display all messages sent by users for display on specific screens. In one embodiment, contents obtained (by pull or push) that is related to the general or specific geographic location of a screen may be ranked below messages directed to the screen. Contents related to tags associated with a screen may be ranked yet lower. In one embodiment, the server 1500 randomly selects a predetermined number (such as five) of the most recently-posted contents (such as contents posted within 20 minutes of the pull or push) for display.

The rule base may include tags that exclude certain contents. For example, contents tagged or otherwise associated with competing establishments (such as a competing bar), or from establishments located closer than a predetermined distance (such as 50 miles) may be excluded from display.

Material displayed on a location-specific screen may include a poll. For example, a restaurant or bar may post a poll soliciting votes for patrons' favorite bartender or waiter. Patrons may vote by sending text messages to designated short codes. Optionally, the messages may include free text that is related or unrelated to the poll. For example, patrons may be encouraged to send comments on their favorite bartender or waiter. In addition to displaying numerical results of the poll, some embodiments process the text comments of the messages. In some embodiments, the comments are treated as another potential source of contents to be displayed on this or another location's screen. That is, the comments may be parsed searching for messages that match content attributes associated with a screen. In other embodiments, the comments are parsed to identify words or phrases that appear often. These words or phrases may be displayed on a screen as topics of apparent current interest. The comments may be parsed, such that negative comments are distinguished from positive comments, using well-known natural language processing techniques.

In some embodiments, a bartender or other service provider may be identified and associated with a location of a screen. Information about the bartender, such as the bartender's birthday, favorite drink, favorite band, etc., may be made available to patrons of the location. This information may, for example, be published on a social network system and/or displayed on the screen. As patrons play the bartender's favorite song or band on the jukebox, order the bartender's favorite drink, etc., the system increments a score for the bartender and periodically or occasionally compares the bartender's score to scores of other bartenders and displays this information on the screen and on the bartender's social network record. Thus, a competition is established, in which patrons influence the winner through their purchases. The bartender may be motivated to act in ways that tend to win points and, collaterally, cause patrons to make certain purchases. The scoring may be arranged to favor a particular brand of product, which pays for this form of advertising.

Figure 20:
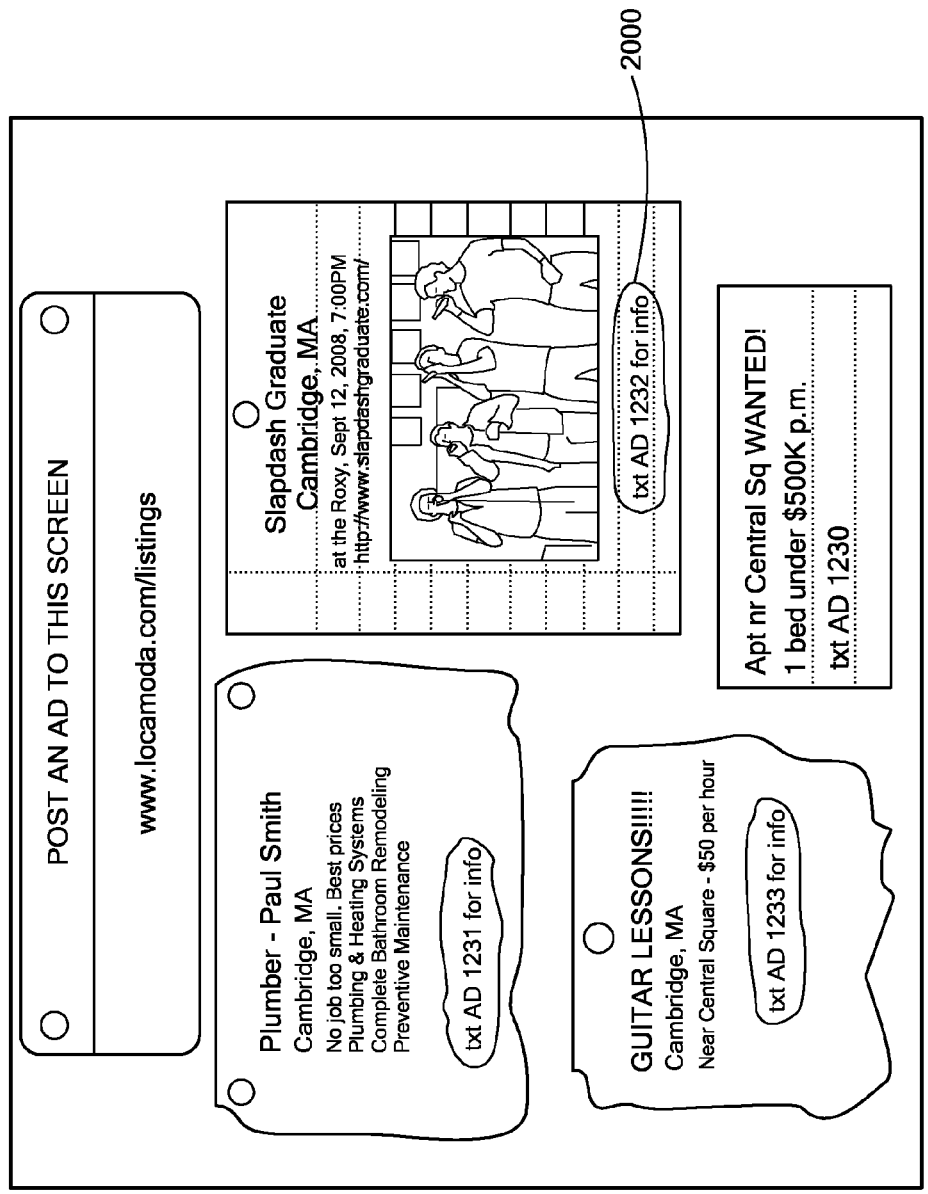

A user may send a message for display on a screen for a predetermined period of time. Such a use enables, for example, posting items for sale or services for hire, as in a "corkboard" application. The message from the user may include an amount of time for which the message is to be displayed, and/or the server 1500 may select the time period. FIG. 20 shows an exemplary screen generated as a result of such "corkboard" messages. A message displayed by the server 1500 as a result of a user-sent corkboard message may include a system-generated address and instructions 2000 (i.e., for more information, send a text message to AD1232) to which another user may respond to inquire about the product or service.

The embodiments of the invention described above are intended to be merely exemplary. Numerous variations and modifications will be apparent to those skilled in the art. All such variations and modifications are intended to be within the scope of the present invention as defined in any appended claims.

A system for displaying contents selected based on a location of a location-specific display screen has been described. Such a system may include a processor controlled by instructions stored in a memory. The memory may be random access memory (RAM), read-only memory (ROM), flash memory or any other memory, or combination thereof, suitable for storing control software or other instructions and data. Some of the functions performed by the system have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on tangible, non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of system have been described with reference to a flowchart, those skilled in the art should readily appreciate that functions, operations, decisions, etc. of all or a portion of each block, or a combination of blocks, of the flowchart may be combined, separated into separate operations or performed in other orders. Furthermore, disclosed aspects, or portions of these aspects, may be combined in ways not listed above. Accordingly, the invention should not be viewed as being limited to the disclosed embodiment(s).

What is claimed is:

1. A system for displaying contents on a geographic location-specific display screen, the system comprising:
    at least one display screen located at a respective specific geographic location;
    a database configured to store, for each display screen of the at least one display screen, at least one selection criterion for contents to be displayed on the display screen, the at least one selection criterion including information about the specific geographic location of the display screen;
    a first server coupled to the at least one display screen, to the database and to at least one content server distinct from the first server, the first server being configured, for each display screen of the at least one display screen, to automatically obtain contents from the at least one content server, select a portion of the obtained contents according to the at least one selection criterion in the database and display the selected portion on the display screen; and
    a web server coupled to the first server and configured to serve, for each of the at least one display screen, a web page to a plurality of remote computers distinct from the at least one display screen, the web page comprising at least some of the contents displayed on the at least one display screen.

2. A computer-implemented method of displaying contents on at least one display screen, each display screen of the at least one display screen being located at a respective specific geographic location, the method comprising:
    storing, in a database, for each display screen of the at least one display screen, at least one selection criterion for contents to be displayed on the display screen, the at least one selection criterion including information about the specific geographic location of the display screen;
    by a first server remote from the at least one display screen, for each display screen of the at least one display screen, automatically obtaining contents from at least one content server distinct from the first server;
    by the first server, for each display screen of the at least one display screen, selecting a portion of the obtained contents according to the at least one selection criterion in the database;
    by the first server, for each display screen of the at least one display screen, displaying the selected portion, via a computer network, on the display screen; and
    by a web server, making at least some of the contents available as a web page to computers other than the display screen.

3. A method according to claim 2, wherein selecting the contents comprises selecting the contents based on at least one content attribute associated with the display screen.

4. A method according to claim 2, wherein displaying the selected portion comprises displaying the selected contents on a display screen selected from the list consisting of:
- a display screen coupled via a computer to a wide area network;
- a display screen of a jukebox;
- a display screen of an interactive game system;
- a display screen of a point-of-sale kiosk; and
- a display screen coupled to a private television distribution network.

5. A method according to claim 2, further comprising associating at least one content attribute with the display screen.

6. A method according to claim 5, wherein associating the at least one content attribute with the display screen comprises associating a plurality of content attributes with the display screen.

7. A method according to claim 6, wherein each of the plurality of content attributes is selected from the set consisting of:
- geographic location of the display screen;
- venue type of the geographic location of the display screen;
- a demographic characteristic of an expected viewer of the display screen; and
- a message topic.

8. A method according to claim 5, wherein associating the at least one content attribute with the display screen comprises receiving a message sent by a user to an address associated with the display screen, the message identifying the at least one content attribute.

9. A method according to claim 8, wherein receiving the message comprises receiving a message sent by the user from a mobile telephone.

10. A method according to claim 8, wherein receiving the message comprises receiving a message sent by the user from an Internet-connected computer, the message traversing at least a portion of the Internet.

11. A method according to claim 5, wherein associating the at least one content attribute with the display screen comprises automatically identifying the content attribute, based on contents selected from the list consisting of:
- contents of at least one message already displayed on the display screen; and
- contents of at least one message to be displayed on the display screen.

12. A method according to claim 5, wherein associating the at least one content attribute with the display screen comprises receiving information descriptive of an activity currently taking place at the geographic location of the display screen.

13. A method according to claim 12, wherein receiving information descriptive of an activity currently taking place comprises receiving automatically-generated information from a game system.

14. A method according to claim 12, wherein receiving information descriptive of an activity currently taking place comprises receiving automatically-generated information about a song being played by a jukebox.

15. A method according to claim 14, wherein automatically sending the contents for display on the display screen comprises automatically obtaining additional information about the song being played by the jukebox.

16. A method according to claim 15, wherein automatically obtaining additional information about the song being played comprises automatically obtaining information about other geographic locations where the song is currently being played.

17. A method according to claim 15, wherein automatically obtaining additional information about the song being played comprises automatically obtaining information about people who are currently playing the song in other geographic locations.

18. A method according to claim 15, wherein automatically obtaining additional information about the song being played comprises automatically obtaining information about people who have indicated an interest in the song or in an artist who performed the song.

19. A method according to claim 2, wherein sending the contents for display on the display screen comprises automatically obtaining the contents, via the Internet, from a system selected from the list comprising:
- a social networking system, a news data system;
- a classified advertisement system;
- an entertainment information system; and
- a syndicated data feed system and an advertisement system.

20. A method according to claim 2, wherein sending the contents for display on the display screen comprises automatically querying a computer system, via the Internet, for the contents.

21. A method according to claim 2, wherein sending the contents for display on the display screen comprises:
- subscribing to a data feed from a computer system; and
- receiving contents automatically sent by the computer system in response to the subscription.

22. A method according to claim 2, wherein automatically selecting the contents comprises automatically selecting the contents according to a rule base, wherein the rule base at least statistically favors displaying contents that were generated specifically for the display screen over contents that were not specifically generated for the display screen.

23. A method according to claim 2, wherein automatically selecting the contents comprises automatically selecting the contents according to a rule base, wherein the rule base at least statistically favors displaying contents that are associated with the display screen over contents that are not associated with the display screen.

24. A method according to claim 2, wherein automatically selecting the contents comprises automatically selecting the contents according to a rule base, wherein the rule base at least statistically favors displaying contents that are associated with the geographic location of the display screen over contents that are not associated with the geographic location of the display screen.

25. A method according to claim 2, further comprising:
- automatically obtaining other contents displayed on another geographic location-specific display screen; and
- displaying the other contents on the display screen.

26. A method according to claim 25, wherein the other contents are selected according to at least one rule.

27. A method according to claim 26, wherein the at least one rule disfavors selecting contents associated with a predetermined set of other geographic location-specific display screens.

28. A method according to claim 2, wherein sending the contents for display on the display screen comprises displaying the obtained contents for an amount of time based at least in part on other contents displayed on the display screen.

29. A method according to claim 28, wherein the amount of time is based at least in part on a number of other contents displayed on the display screen.

30. A method according to claim 2, wherein sending the contents for display on the display screen comprises displaying the obtained contents for a predetermined amount of time.

* * * * *